United States Patent [19]

Isobe et al.

[11] Patent Number: 5,995,108
[45] Date of Patent: Nov. 30, 1999

[54] 3D IMAGE COMPOSITION/DISPLAY APPARATUS AND COMPOSITION METHOD BASED ON FRONT-TO-BACK ORDER OF PLURAL 2D PROJECTED IMAGES

[75] Inventors: Yoshiaki Isobe; Koichi Sano, both of Yokohama; Michio Oikawa, Ebina, all of Japan

[73] Assignee: Hitachi Medical Corporation, Tokyo, Japan

[21] Appl. No.: 08/665,986

[22] Filed: Jun. 19, 1996

[30] Foreign Application Priority Data

Jun. 19, 1995 [JP] Japan .................................. 7-151336

[51] Int. Cl.$^6$ .................................................. G06F 3/153
[52] U.S. Cl. ................................................................ 345/421
[58] Field of Search .................... 345/419, 421, 345/422, 502

[56] References Cited

U.S. PATENT DOCUMENTS

| 4,737,921 | 4/1988 | Goldwasser et al. | 345/421 |
| 4,775,946 | 10/1988 | Anjyo | 345/419 |
| 5,001,470 | 3/1991 | Bandai | 345/422 |
| 5,201,035 | 4/1993 | Stytz et al. | 345/502 |
| 5,377,313 | 12/1994 | Scheibl | 345/422 |

FOREIGN PATENT DOCUMENTS 1-37678  2/1989  Japan .

OTHER PUBLICATIONS

Nakamae et al., *3D Computer Graphics,* p. 164, published by Shōkōdo (in Japanese), from M.E. Newell et al., "A New Approach to the Shaded Picture Problem", Proc. ACM Nat. Conf., 1972, p. 443.

M. Levy, "Volume Rendering: Display of Surfaces from Volume Data", *IEEE Computer Graphics and Applications,* vol. 8, No. 3, May 1988, pp. 29–37.

K. Nishikawa et al., "High-speed 3D Computer Graphics System 'Subaru': High-speed Drawing Processor", *Collected Lectures 6, Autumn 1992 Convention, The Institute of Electronic Information and Communication Engineers of Japan,* 1992, p. 204 (in Japanese).

Asahi Chemical Information System, Inc., "Digitization and Three–Dimensional Image Processing of Medical Images", *Visual Information (M),* vol. 26, No. 10, May 1994, pp. 606–607 (in Japanese).

M. Ishii, *Visualization Machine,* p. 12, published by Ohm prior to Jun. 19, 1996 (in Japanese).

*Primary Examiner*—Mark R. Powell
*Assistant Examiner*—Huedung X. Cao
*Attorney, Agent, or Firm*—Antonelli, Terry, Stout & Kraus, LLP

[57] ABSTRACT

An apparatus for composing and displaying a three-dimensional image comprises a device for computing a plurality of two-dimensional projected images from the same direction of a viewing line by a volume rendering scheme for each of a plurality of regions of interest set on three-dimensional data, a device for determining degrees to which each pixel of a plurality of two-dimensional projected images is involved in the display using the computed two-dimensional projected images and representative display surface depth values, each obtained for each pixel of the two-dimensional projected images, and a device for determining the total sum of the degrees of display involvement for each projection point and determining the pixel value of the projection plane.

21 Claims, 19 Drawing Sheets

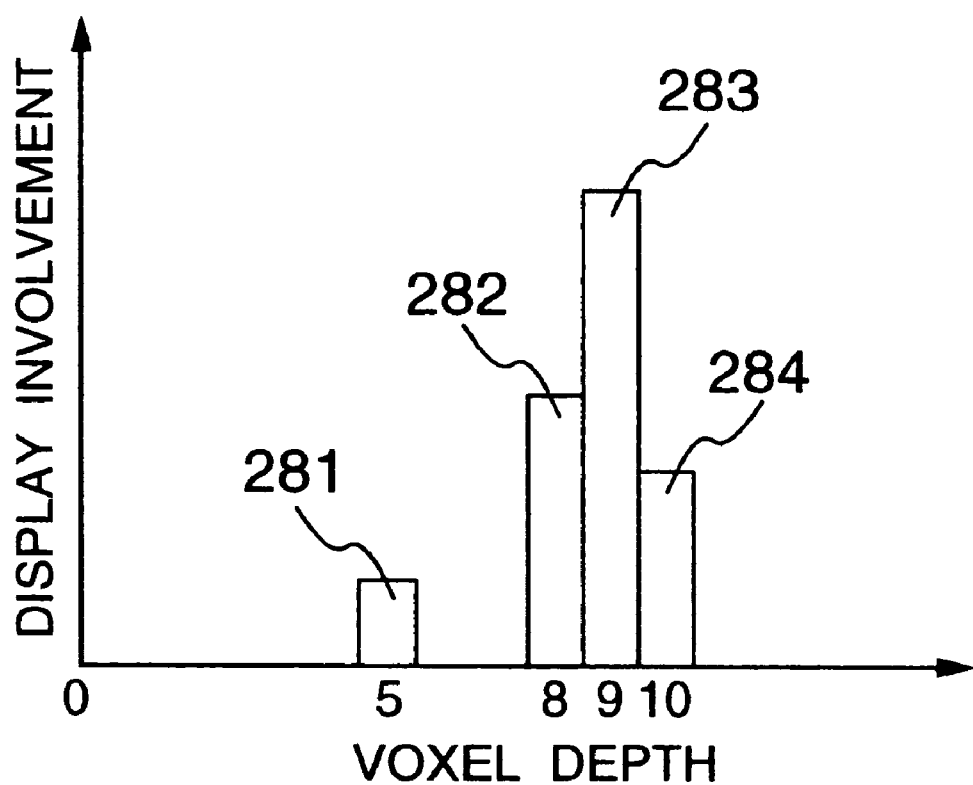

HEAD SURFACE IMAGE

BONE SURFACE IMAGE

BLOOD VESSEL IMAGE

3D IMAGE COMPOSITION/DISPLAY APPARATUS AND COMPOSITION METHOD BASED ON FRONT-TO-BACK ORDER OF PLURAL 2D PROJECTED IMAGES

BACKGROUND OF THE INVENTION

The present invention relates to the composition and display of a three-dimensional image of a plurality of three-dimensional volume data obtained by an X-ray CT system, an MRI system, a 3D ultrasonic diagnosis system or an emission CT system, or more in particular to a three-dimensional image composition and display apparatus and a three-dimensional image composition method comprising a function of computing a two-dimensional projected image having a representative display surface depth (Z buffer) value in the same direction of the viewing line for each data, and a function of composing and displaying a translucent or opaque image of high image quality in correct three-dimensional position using a plurality of such two-dimensional projected images.

Well-known techniques relating to the present invention are disclosed in the following references:

(1) M. Levoy: Volume Rendering; Display of Surface from Volume Data, IEEE Computer Graphics & Applications, May 1988, vol. 8, No. 3, PP. 29–37

(2) Newell, M. E., Newell, R. G. and Sancha, T. L.: A New Approach to the Shaded Picture Problem, Proc. ACM. Nat. Conf., (1972) p. 443

This art is introduced in Nakamae et al, "3D Computer Graphics" Produced by Shokodo, P. 164.

(3) Visualization Machine, p. 12, by Mitsuo Ishii, published by Ohm (4) High-Speed High-Performance Three-Dimensional System "Subaru", Vol. 4, High-Speed Plotting Mechanism, by Katsuhiko Nishikawa, Takahiro Sakuraniwa, Hideki Saito, Junichi Sugiyama and Akihiko Matsuo, p. 204, Collected Lectures 6 at Autumn Convention, 1992, The Institute of Electronic Information and Communication Engineers of Japan (5) JP-A-1-37678 (originally published as JP-A-64-37678)

(6) Digitization and Three-Dimensional Image Processing of Medical Images, Asahi Chemical Information System Inc., Visual Information (M), May 1994, pp. 606–607

Reference (1) deals with the volume rendering of three-dimensional data. The three-dimensional data for volume rendering is considered to include translucent voxels. As a result of ray tracing from the view point toward an object, the opacity of each voxel is defined as the degree to which the light changes in transmittance as it passes through the translucent voxel, and the total sum of the light quantities reflected from the voxels is projected as a pixel value for a projection plane.

A simple method of composing a transparent or a translucent object by CG technique is Newell's one. This method is intended to express the transparency by mixing the color of a background object with that of a transparent object.

The technique of reference (3) uses the Z-buffer function as a method for processing a plane hidden by an overlapped object. In this technique, the surface position of each object model as viewed from the view point plane is compared with the value of the Z buffer. For the portion where an object is overlapped, the Z buffer near to the view point plane and the projection value of the particular object are rewritten, so that a projected image is obtained for all the objects by similar computations.

According to reference (4), a plurality of plotting mechanisms are connected through a depth data control mechanism so that images generated by the plotting mechanisms can be composed on the basis of the depth values. In this method, a plurality of images of a plurality of primitives defined in a three-dimensional space are generated in parallel by a plurality of plotting mechanisms. These images are composed to produce a three-dimensional image. In this method, therefore, the time can be saved by using a number of the plotting mechanisms.

With regard to references (2) to (4), in the case where a plurality of three-dimensional data are composed and displayed, it is necessary that portions to be displayed are three-dimensionally extracted from each data by being segmented, and segmented portions are embedded in the three-dimensional data to be integrated for the purpose of composition and display.

From the data integrated into a three-dimensional data this way, the technique of reference (5) extracts an arbitrary structure and produces the distance thereof from the projection plane. Surface images inside and outside a clipped region set in an arbitrary shape are composed and displayed in a frame of image.

Reference (6) discloses a 3D composition software called "Dr. View/Blender". This software permits display as viewed from a free direction. A portion of the display object is clipped, and an image of a different modality can be attached to the clipped portion in a predetermined ratio.

In taking a picture of an affected part by X-ray CT equipment, various angiographic operations are performed to obtain three-dimensional information on the network blood vessels and bone conditions at and in the vicinity of the affected part. Also, MRI can produce three-dimensional information on the condition of and the blood flow in the flesh with minimal invasive. Further, emission CT can generate three-dimensional information on the physiological functions of the human.

It is highly desired and required that the three-dimensional information thus obtained by various photographic methods are effectively utilized to contribute to the diagnosis and proposed operations, and data are mutually complemented to compose and display the data.

Conventionally, a volume rendering method for visualizing a display surface without uniquely determining it as in reference (1) is well known as a method for visualizing a single three-dimensional data such as described above with a high image quality. According to this method, which employs a visualization algorithm for causing several voxels of the smoothly-changing display surface to be involved in the projection value, it cannot be determined which voxel corresponds to the representative display surface depth (Z buffer) value. Also, the composition of a plurality of three-dimensional data requires a plurality of three-dimensional data to be displayed in a three-dimensional space and therefore consumes a great memory capacity. Further, for each tissue (region of interest) to be displayed translucently in such a manner that their stereoscopic overlapping conditions can be understood, an optimum parameter is very difficult to obtain due to the complicated setting of the rendering parameters.

Reference (5) discloses a technique in which each region of interest to be displayed is extracted from each three-dimensional data by segmentation. The segments thus extracted are embedded at corresponding positions of the three-dimensional data to be integrated for the purpose of composition and display. In this method, since segments associated with different data are embedded, the resulting image develops a discontinuous plane, which is expected to deteriorate the image quality at the time of composition and display by volume rendering.

Various image composition techniques including references (2), (3) and (4) are proposed for three-dimensional CG. These methods make it necessary that each region of interest of a plurality of three-dimensional data is modified into three-dimensional coordinate data such as the surface position data, expressed as a single three-dimensional vector data for rendering, and then rendered. For this reason, a volume rendering method with a superior image quality cannot be selected for each region of interest.

Furthermore, a composed image having a three-dimensionally conforming front-to-back order is impossible to produce by such a method as disclosed in reference (6) in which the result of a different data projection is simply attached to the projection result of three-dimensional data in a predetermined ratio to compose an image.

SUMMARY OF THE INVENTION

An object of the present invention is to improve these problem points and to provide an apparatus for composing and displaying a three-dimensional image and an image composition method, which is easily capable of composing and displaying a translucent or opaque volume-rendered image (two-dimensional projected image) of high quality without producing new three-dimensional data by integrating a plurality of different three-dimensional data. In other words, the invention is intended to realize an apparatus and a method for achieving in quick and simple fashion the composition and display of a three-dimensional image, which consumes a very long time and complicated processing in the conventional volume rendering method.

Another object of the invention is to make possible volume rendering with an optimum visualization parameter for each region of interest and thus to make possible composition and display of a high-quality volume-rendered image.

Still another object of the invention is to provide an apparatus and a method, in which a single representative display surface depth (Z buffer) value can be determined from the depth value of a voxel most deeply involved in the display at the time of producing a volume-rendered image for each region of interest. Volume rendering for composition and display based on the representative display surface depth value thus determined can produce a three-dimensional composed image with a correct three-dimensional front-to-back order.

A further object of the invention is to provide an apparatus and a method which can produce an arbitrary translucent composed image and an opaque composed image by setting an arbitrary level of opacity for each volume-rendered image.

A still further object of the invention is to provide an apparatus and a method, in which three-dimensional functional data representing the activity of the tissue can be composed and displayed on a volume-rendered composed image obtained from a plurality of three-dimensional geometric data representing anatomical data.

A yet further object of the invention is to provide an apparatus and a method for composition and display of multi-modality data, in which each of a plurality of photographing means includes a processor capable of volume rendering thereby to permit parallel computation of two-dimensional projected images, and thus an image can be composed by transferring only the result of parallel computation to an image composing means without transferring the large amount of three-dimensional volume data.

In order to achieve the above-mentioned objects, according to one aspect of the invention, there is provided a three-dimensional image composition apparatus comprising a hard disk (104 in FIG. 1) for storing three-dimensional data, a computer (100 in FIG. 1) for performing the volume rendering and composition of projected images, a display (103 in FIG. 1) and a device (102 in FIG. 1) for inputting the display coordinate.

The computer 100 includes volume-rendering processing function (211 in FIG. 2) for visualizing three-dimensional data, processing function (220 in FIG. 2) for extracting regions of interest, processing function (221 in FIG. 2) for performing the volume rendering for the extracted regions, and processing function (211, 221 in FIG. 2) for determining the representative display surface depth (Z buffer) value at the time of rendering by the foregoing processing functions.

The volume rendering functions 211, 221 produce a two-dimensional projected image (FIG. 9) with an optimum rendering parameter for each region of interest with respect to each three-dimensional data appropriately positioned, and determine a rendering luminance value for each pixel of the projected image together with a representative display surface depth (Z buffer) value (FIG. 10) as a voxel depth value on the ray tracing line most deeply involved in the rendering luminance value.

According to another aspect of the invention, there is provided an apparatus and a method for composing a three-dimensional image, further comprising a function for performing the volume rendering on a plurality of three-dimensional data from the same direction of the viewing line and producing a plurality of two-dimensional projected images (with Z buffer), and a function for producing a plurality of two-dimensional projected images (with Z buffer) with a plurality of rendering parameters from the same direction of the viewing line.

According to still another aspect of the invention, there is provided an apparatus and a method for composing a three-dimensional image, further comprising a function for computing the involvement in the pixel value of a composed image and thereby producing the image composition result (FIG. 13) from the front-to-back order determined on the basis of the representative display surface depth (Z buffer) value for each pixel of a plurality of two-dimensional projected images computed from the direction of the same viewing line by the volume rendering function on the one hand, and from the opacity set for each two-dimensional projected image and the luminance value of the pixel of each image on the other hand.

According to a further aspect of the invention, there is provided an apparatus and a method for composing a three-dimensional image, in which the function for composing and displaying two-dimensional projected images (with Z buffer) similarly obtained in the same direction of the viewing line includes a function (331 in FIG. 6) for setting the opacity for each image, a function (360, 370 in FIG. 6) for changing the luminance value for each image, a function (634, 635 in FIG. 16) for performing an arbitrary affine-transformation for each image, and a function (637 in FIG. 16) for changing the representative display surface depth (Z buffer) value uniformly for each image.

According to a yet further aspect of the invention, there is provided an apparatus and a method for composing a three-dimensional image, further comprising a function (FIG. 18) for determining the representative display surface depth (Z buffer) value of a composed image from a maximum representative display surface depth (Z buffer) value used for calculating a pixel value of the two-dimensional projected images composed as described above, and composing a value of three-dimensional functional data on the surface of the composed image from the representative display surface depth value thus determined and the direction of the viewing line in which the composed image is computed thereby to produce a composed image of functional information.

According to yet another aspect of the invention, there is provided a system for composing a three-dimensional multi-modality image, comprising a plurality of processors (810, 820, 840, 850 in FIG. 19) respectively for a plurality of photographing function, wherein each processor includes a function of positioning data to a common coordinate system and a function of producing a two-dimensional projected image by volume rendering in the direction of the viewing line specified by an image composing unit, a function for determining the representative display surface depth (Z buffer) value, and a function (FIG. 20) for transferring the two-dimensional projected image and the representative display surface depth (Z buffer) value to the image composing unit thereby to produce a composed image.

According to the present invention, a plurality of two-dimensional projected images are produced independently from a plurality of three-dimensional data from the same direction of the viewing line, and the computation is performed for composition for each of the two-dimensional projected images thus obtained. Therefore, a composed image can be produced easily without any need of integrating a plurality of three-dimensional data.

Further, since a two-dimensional projected image is produced for each region of interest, an optimum volume rendering parameter can be selected for each region of interest, thereby making it possible to display a composed image of high quality.

Furthermore, although the conventional volume rendering scheme does not determine an optimum Z buffer value, the technique according to the invention determines an optimum representative display surface depth (Z buffer) value from the depth value of the voxel most deeply involved in the display. At the time of image composition, this value is used to determine a three-dimensional front-to-back order and perform the composition operation in accordance with the relative positions. In this way, an image can be composed and displayed with correct three-dimensional relative positions.

In addition, in view of the fact that the opacity degree can be set for each two-dimensional projected image by dialog through the user entry, an arbitrary translucent composition/display or an arbitrary opaque composition/display (with highest priority placed on the pixel value of the image in the foreground) is made possible.

What is more, the functional information including the three-dimensional functional data can be composed and displayed on the display surface of an image composed from a plurality of three-dimensional data.

Furthermore, a network configuration including a plurality of processors associated with a plurality of modalities respectively permits the result of the operations of the processors to be transferred to an image composition and display unit through the network for multi-modality composition and display.

The following image composition is possible, for example, when the invention is applied to the composition and display of a three-dimensional image of a head.

A two-dimensional projected image of each of the regions of interest including the skin, skull and the brain tissue is produced by a volume rendering method. In the process, a representative display surface depth value (Z buffer value) representing the distance up to each voxel of a display surface of each of the regions of interest the three-dimensional image data from the projection plane is determined and stored in memory.

The opacity degree is set for each of the skin, skull and the brain tissue. A virtual light source is placed on the projection plane, and light from each projection point is assumed to be irradiated to each tissue. The front-to-back order of each region of interest is decided from the representative display surface depth value (Z buffer value) on the memory space for each ray tracing line, while the amount of reflected light and the amount of transmitted light are determined for each region of interest. The total light amount reflected from the regions of interest is determined for each ray tracing line thereby to obtain the pixel values for the projection points. An image is displayed based on the pixel values of the projection points thus obtained.

In the case where the skin, skull and the brain tissue are set in a translucent state, a translucent three-dimensional image is displayed for each tissue.

As described above, according to the present invention, a representative display surface depth (Z buffer) value is determined for a high-quality volume-rendered image without integrating three-dimensional data. Using this representative display surface depth value for composing a projected image, correct three-dimensional relative positions are secured for composing an image. Also, optimum rendering parameters can be selected for each region of interest, and therefore a high-quality image can be composed and displayed for region of interest. Another conspicuous effect achieved by the apparatus of the invention is that an image of arbitrary opacity degree can be composed for each region of interest.

An example of image composition according to the invention is shown in FIG. 21. Composition of such a clear translucent image as this according to the prior art requires a great amount of time and complicated computations. These problems have been overcome by the invention.

BRIEF DESCRIPTION OF THE DRAWINGS

FIG. 5 is a bar graph representing the degree of involvement of voxels in the display for volume rendering.

DESCRIPTION OF THE PREFERRED EMBODIMENTS

The invention will be described with reference to embodiments.

Figure 1:
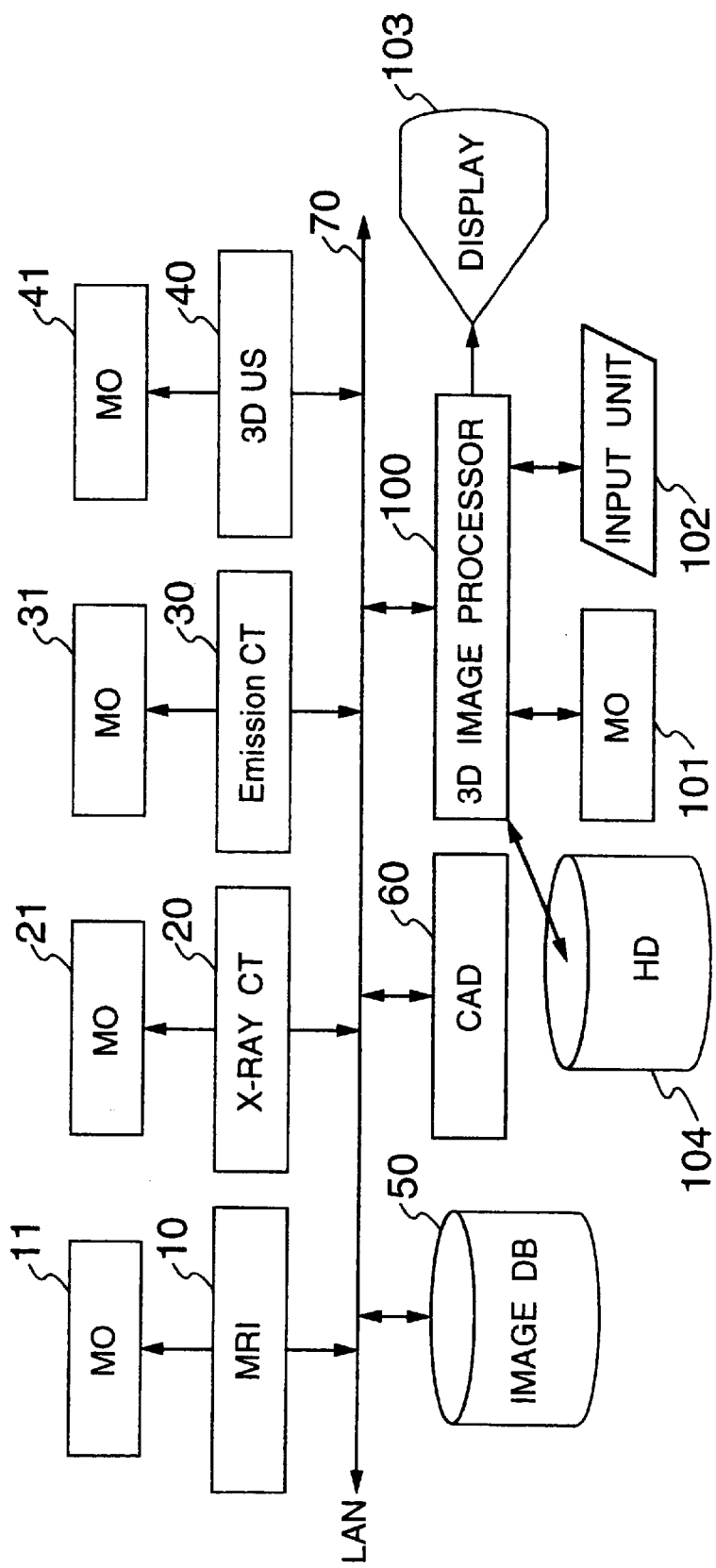
FIG. 1 is a configuration diagram showing a three-dimensional image composition and display system according to an embodiment of the present invention.

FIG. 1 shows an example system configuration of the invention, to which an image composition and display method according to each embodiment of the invention is applied.

The three-dimensional data measured by an X-ray CT device 20 is transmitted on-line through a network 70 to a hard disk 104 of a three-dimensional image processing unit 100. Alternatively, the three-dimensional data measurement is recorded in a magneto-optical disk MO 21, the recording medium of which is set in and read off-line from the magneto-optical disk MO 101 connected to the three-dimensional image processing unit 100 and transferred to the hard disk 104.

The three-dimensional data measured by each of an MRI device 10, a 3D ultrasonic diagnosis device 40 and an emission CT 30 are also transferred through a similar route to the hard disk 104 of the three-dimensional image processing unit 100.

The three-dimensional image processing unit 100 includes the magneto-optical disk 101, the hard disk 104, an input unit 102 and a display unit 103.

(Embodiment 1)

The image composition of a plurality of volume-rendered three-dimensional data will be explained with reference to the first embodiment.

Figure 2:
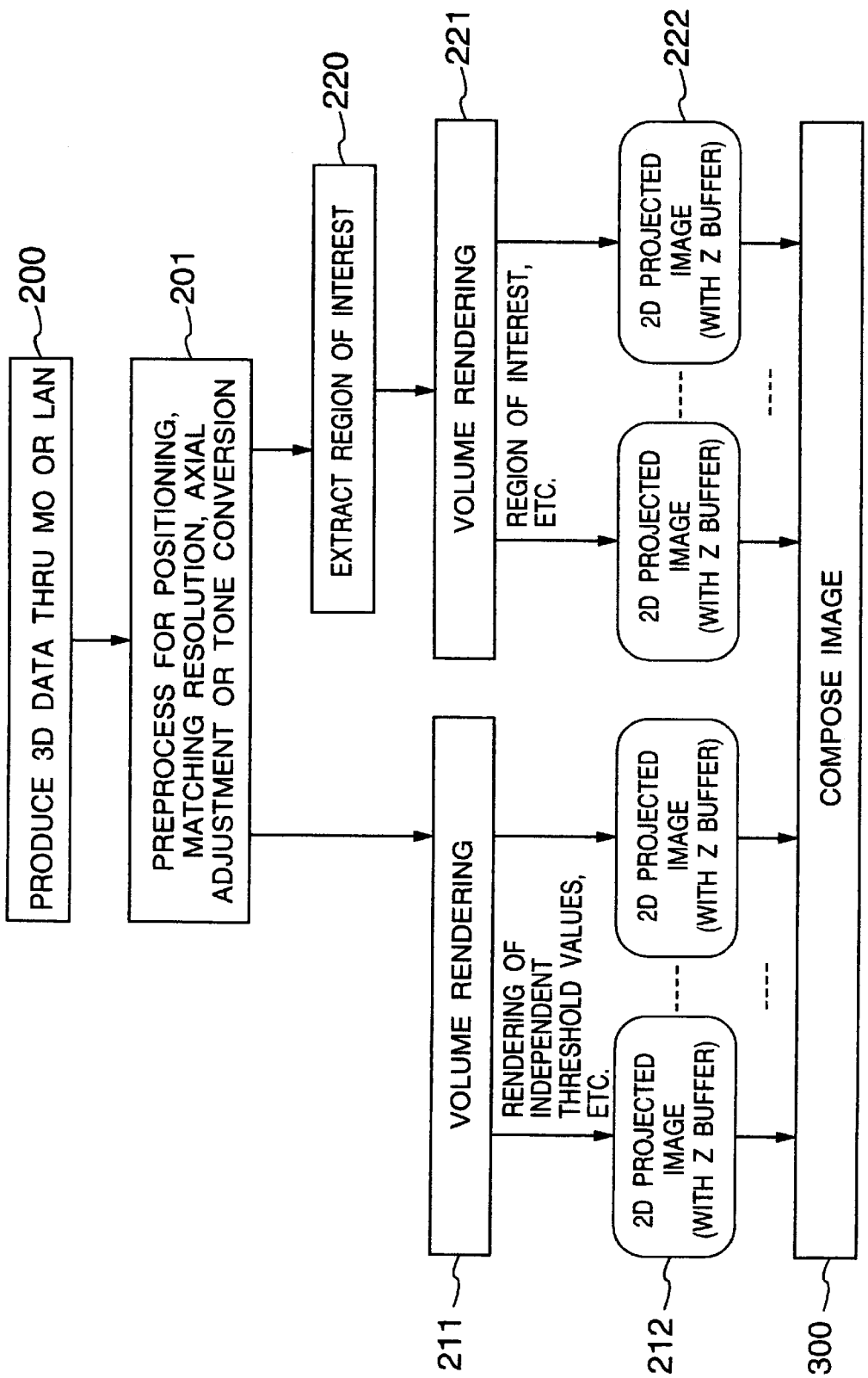
FIG. 2 is a flowchart showing the processing steps from acquisition of three-dimensional data to image composition according to an embodiment.

FIG. 2 is a flowchart showing the processing steps in the three-dimensional image processing unit 100. The flowchart of FIG. 2 is stored in a recording medium as well as the flowchart of FIG. 13.

Step 200 reads the three-dimensional data into the three-dimensional image processing unit 100 by means of the above-mentioned devices.

Step 201 reprocesses a plurality of data read at step 200 by adjusting the position, resolution and the axial direction thereof and transforming each of the data into an optimal tone.

Step 211 subjects the data generated at step 201 to the volume rendering processing supported by the three-dimensional image processing unit 100, performs the rendering operation thereon with an optimum parameter for each region of interest thereby to produce a two-dimensional projected image 212.

Step 220 extracts the region of interest supported by the three-dimensional image processing unit 100 and segments the region of interest for each data generated by step 201.

Step 221 subjects each region of interest segmented by step 220 to the volume rendering operation supported by the three-dimensional image processing unit 100, thereby producing a two-dimensional projected image 222.

The two-dimensional projected images 212, 222 have a pixel value representing the luminance and a representative display surface depth (Z buffer) value for each pixel. The luminance value of an image is assumed to be determined as the value for an arbitrary color from a color map table and the pixel value of the image. The color map table is defined as header information for each image.

The edge region can be set to a high luminance by collectively inversely setting the color map table of the two-dimensional projected image by a switch. This operation can be realized in terms of the relation that a maximum value less a set value equals an inverted set value.

The two-dimensional projected images 212, 222 thus obtained are applied to a composition and display step 300. The content of the composition and display step 300 corresponds to the flowcharts of FIG. 7 and subsequent figures.

Figure 3:
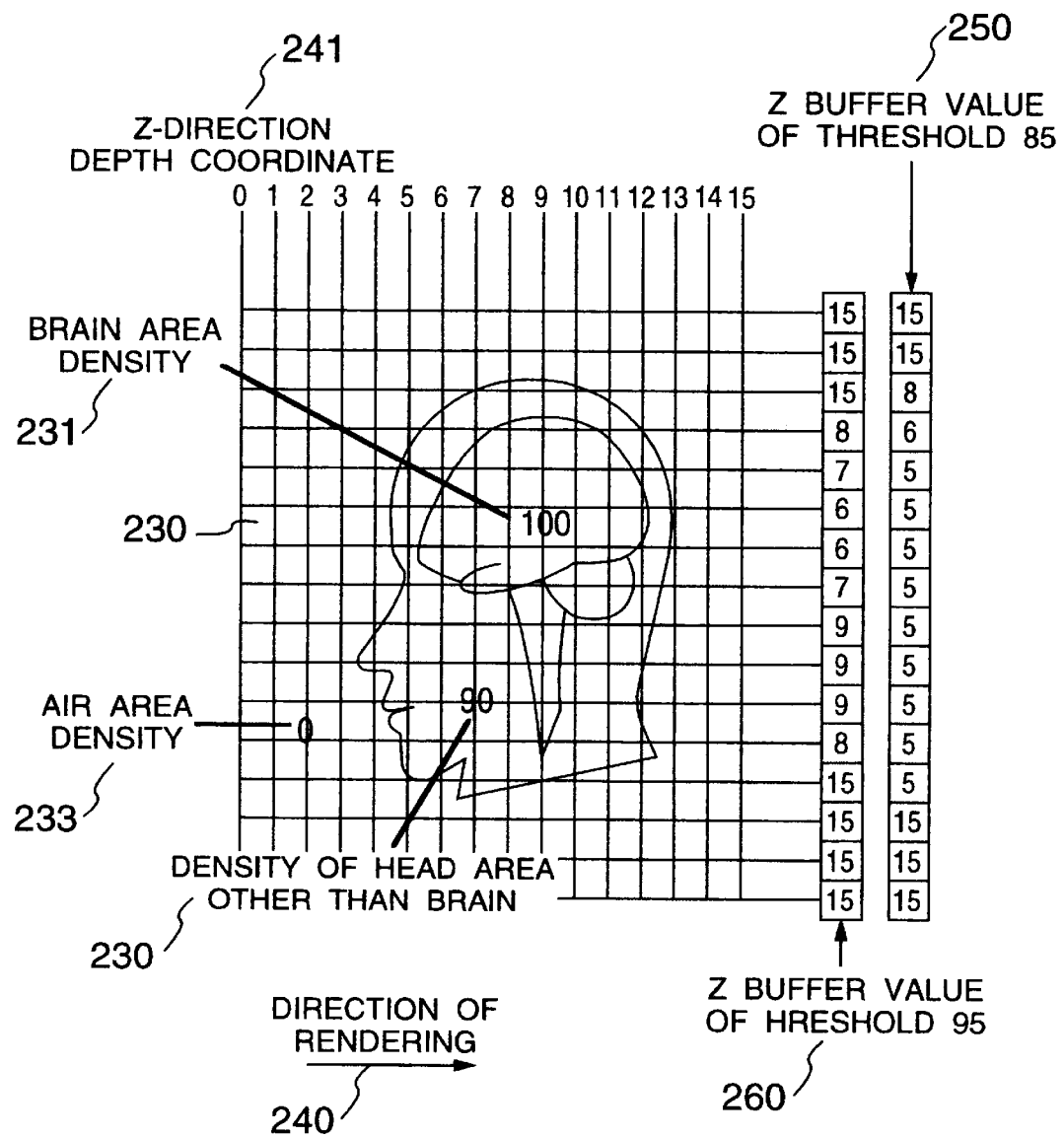
FIG. 3 is a diagram for explaining the representative display surface depth (Z buffer) value applied to the invention.

FIG. 3 is a diagram for explaining the representative display surface depth (Z buffer) value of the three-dimensional image data applied to the composition and display step.

A grid 230 represents a rendering coordinate system for a given slice of the three-dimensional data and is assumed to be a sagittal section of the head. With this image, the density value 231 of the brain region is set to "100", the density value 232 of the head region other than the brain to "90", and the density value 233 of the air region to "0".

An arrow 240 indicates the direction of the viewing line for the rendering operation. The scale of display depth for rendering from this direction is designated by 241.

In visualizing these data with the head as a region of interest, the threshold value of the rendering parameter is set to 85 or more, so that the region involved in the display can be limited to the head and the head can thus be visualized. In this way, the pixel value is progressively ray-traced for each point of the grid 230 along the rendering direction 240, and the value on the representative display surface depth scale 241 of the coordinate points of the first threshold value of 85 or more are stored in the Z buffer for the projection plane. At this time, the representative display surface depth (Z buffer) value determined for each pixel of the projection plane is 250.

Similarly, in the case where the region of interest is the brain, the brain region can be visualized by setting the threshold value at 95 or more. In the process, the representative display surface depth (Z buffer) value as designated by 260 is obtained.

The surface rendering with more than the above-mentioned density threshold value applied to the measurement data of MRI or X-ray CT, however, cannot produce a smooth projected image due to measurement noises. For this reason, the volume rendering method in which several pixels in the vicinity of the display surface is involved in a projected image is used thereby to produce a high-quality projected image.

Now, volume rendering operations of 211, 221 of FIG. 2 will be described.

Assume that the opacity degree α and the reflectivity of each voxel are equal to each other and the light transmittance of the voxel is (1−α). Also, the light reflected from a voxel located at each point is assumed to be transmitted and reaches a projection point in accordance with the transmittance of other voxels located before the projection plane. The effect that the degree of involvement or contribution Q of each voxel in the display has on the projection value is determined from equation 1.

$$Q = \alpha(i)c(i)\prod_{j=1}^{i-1}(1-\alpha(j)) \quad \text{Equation 1}$$

where i represents the voxel to be processed. More specifically, i−1 represents the voxel previously processed. C(i) is a function of the gradient vector of the voxel density value.

Consequently, $\Pi(1-\alpha(j))$ is the product of the transmittances of the voxels interposed between point i and the projection plane and indicates the transmittance of the light $\alpha(i)c(i)$ reflected from the voxel at point i through the projection plane.

The effect that the sum of the display involvement Q that has on the projection value of each voxel constitutes the projection value for volume rendering.

The value of a given pixel on the projection plane is thus determined. This computation process is applied to all the pixels on the projection plane thereby to obtain two-dimensional projected images of 212, 222, each having a representative display surface depth value which is explained later.

Figure 4B:
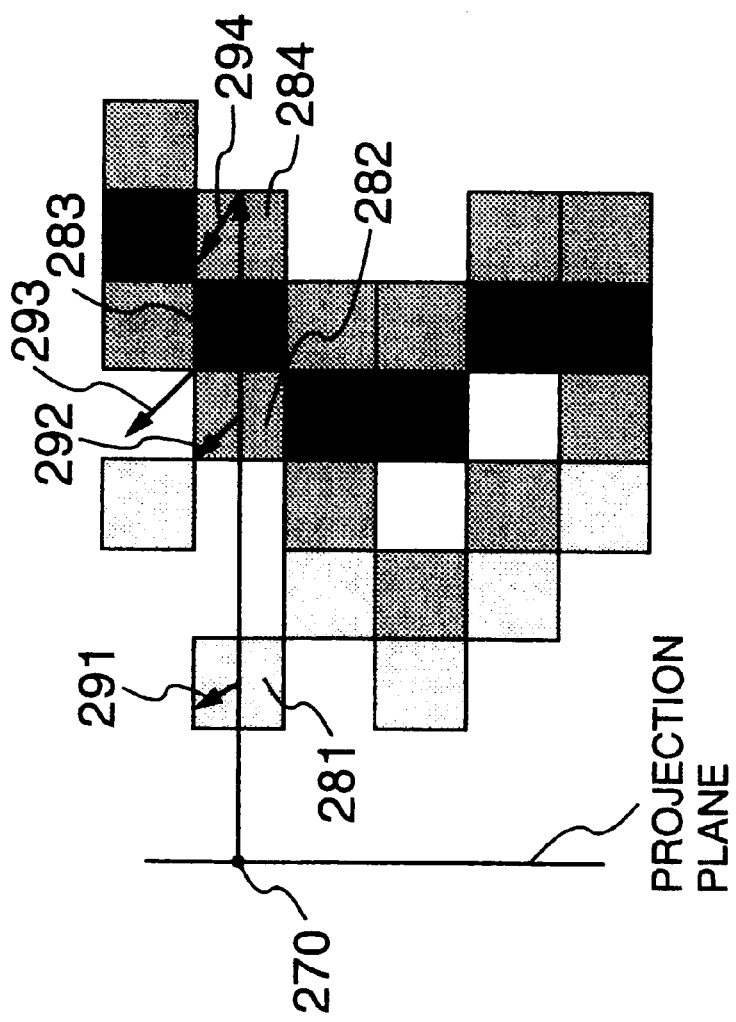
FIGS. 4A, 4B are diagrams for explaining the volume rendering as compared with the surface rendering.
Figure 4A:
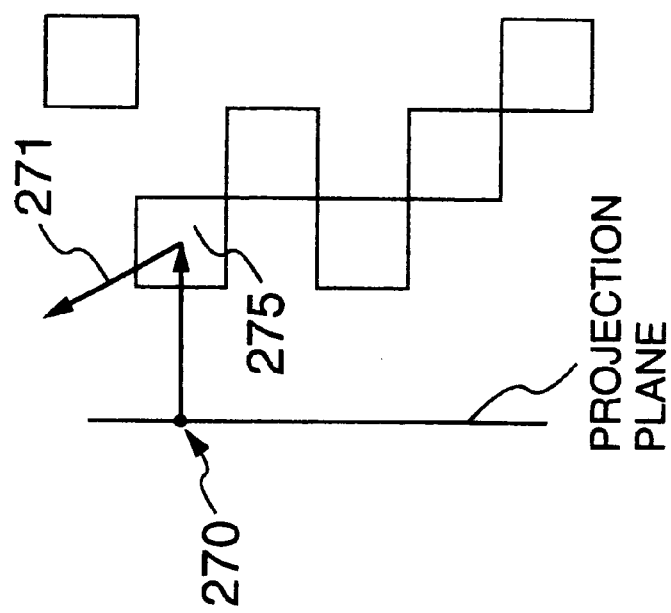

The volume rendering is compared with the surface rendering in FIGS. 4A and 4B. FIG. 4A shows a model diagram of a ray tracing section for the surface rendering, and FIG. 4B that for the volume rendering.

In the surface rendering at the projection point 270, the display surface is represented by a single voxel for each projection point as designated by 275 and the light is reflected as designated by 271.

With the volume rendering, on the other hand, as described above, the display surface is constituted of several voxels including, say, 281 to 284 for rendering at the same projection point 270, and the projection value is determined by the total sum of the products (equation 1) of the amount of the light reflected on and that of the light reaching the voxels 291 to 294. In the case under consideration, the opacity degree a is taken as the primary function of the voxel density value and the gradient parameter designated by dialogue. The degree Q to which each voxel is involved in the display for the case under consideration is shown by a graph in FIG. 5.

As described above, with the volume rendering, the display surface involves several voxels, and therefore a single representative display surface depth value can be determined uniquely. For this purpose, the following schemes are conceivable:

(a) The voxel first involved in the display is assumed to be a display surface voxel.

(b) The average is taken of the depth values of all the voxels involved in the display.

(c) The voxel representing the maximum involvement in the display are considered as a display surface voxel.

According to this embodiment, the representative display surface depth value is defined by the method (c) considered to involve the least error with an assumed surface. In the case under consideration, the voxel 283 (FIG. 5) which is involved in the display to the greatest degree among all the voxels constitutes a display surface, for which the representative display surface depth value is 9. In the method (a), on the other hand, the voxel 281 constitutes a display surface with the representative display surface depth value of 5. According to the method (b) which is for taking an average of the depth values of voxels 281 to 284 involved in the display, the representative display surface depth value is given as (5+8+9+10)/4=8. The method (a) is most simple and can be processed quickly, while the method (c) permits a composition and display with highest accuracy. The method (b) is a compromise between the methods (a) and (c).

Figure 6:
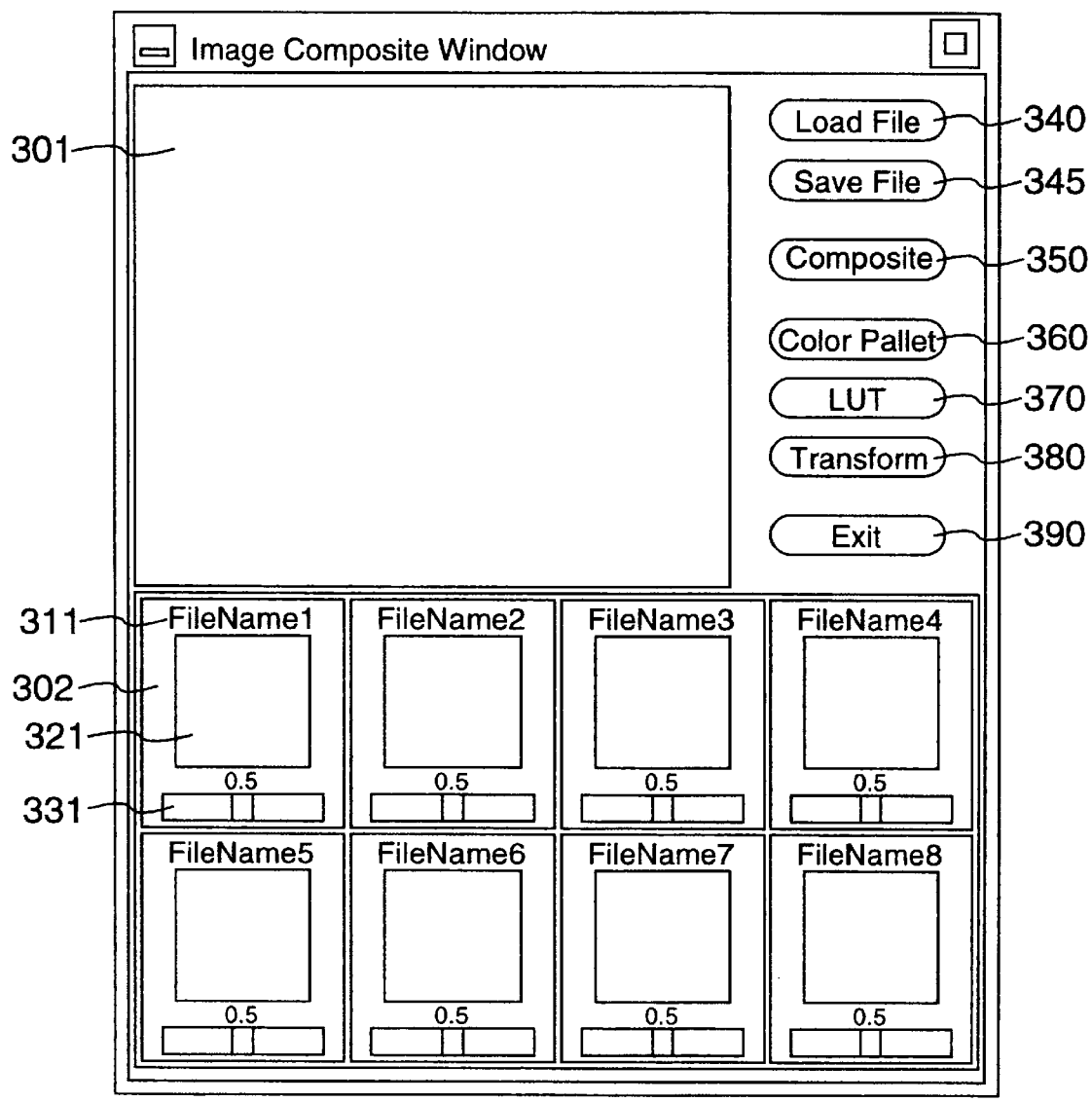
FIG. 6 is a diagram showing a screen configuration of the image composition function according to an embodiment of the invention.
Figure 7:
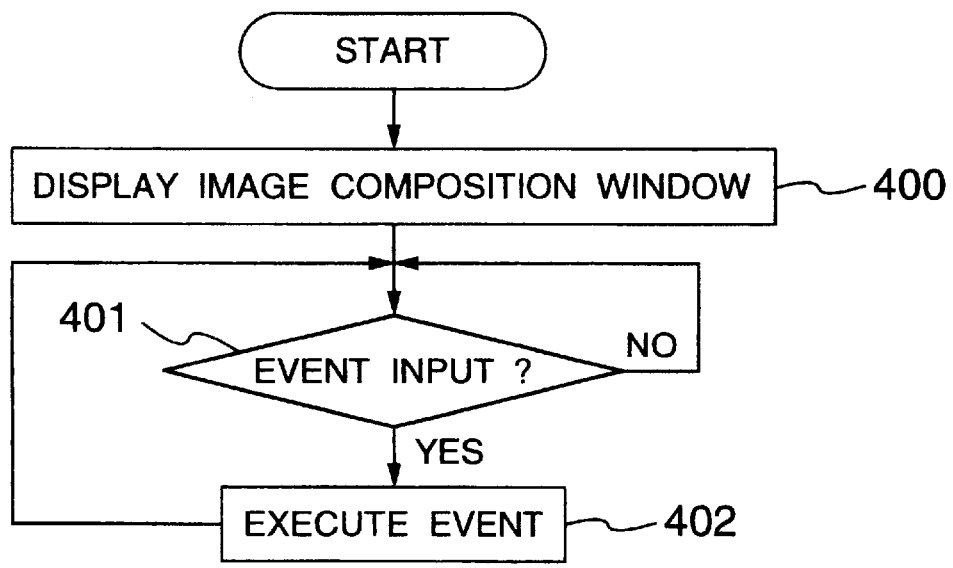
FIG. 7 is a flowchart showing the main routine representing the image composition function according to an embodiment of the invention.

FIG. 6 shows an example configuration of the composition and display means, and FIG. 7 the main routine for the composition and display means.

This embodiment is configured on the basis of the object-oriented concept, so that the routine for each function is started by an event 401 created on the mouse or keyboard.

An image composition result is displayed on a window 301. A plurality of two-dimensional projected image (212, 222 in FIG. 2) frames rendered from the same direction of the viewing line are read on a window 302.

The name of each two-dimensional projected image that has been read is displayed on a label 311, and a two-dimensional projected image is displayed as a reference on a window 321. The degree of opacity is set for each corresponding two-dimensional projected image on a slider 331 thereby to issue an image composition event.

A push button 340 issues an event for reading a two-dimensional projected image by clicking the mouse.

A push button 345 issues an event for storing in file the result of composition and display on the window 301 by clicking the mouse.

A push button 350 issues an event for composing the two-dimensional projected image displayed on the window 302 by clicking the mouse.

A push button 360 issues an event for changing the color of the two-dimensional projected image read in arbitrarily by clicking the mouse.

A push button 370 issues an event for changing the LUT of the two-dimensional projected image arbitrarily read in by clicking the mouse. The clicking of the mouse is assumed to permit selective change of the luminance value change table registered in advance.

A push button 380 issues an event for modifying the two-dimensional projected image arbitrarily read in by clicking the mouse.

A push button 390 issues an event for terminating the composition and display function by clicking the mouse.

Figure 8:
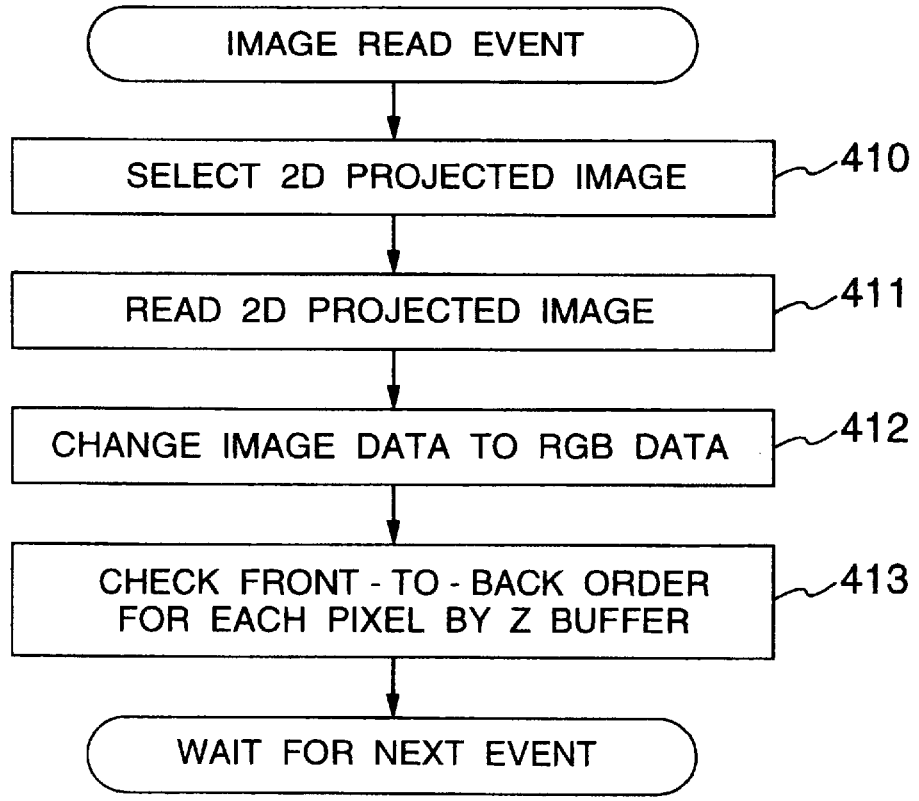
FIG. 8 is a flowchart for the data preparation routine (routine for processing an image read event) for image composition according to an embodiment of the invention.

FIG. 8 shows a routine for processing an image read event.

Upon issue of an event for reading an image (step 401 in FIG. 7), step 410 displays a two-dimensional projected image selection window and selects arbitrary two-dimensional projected images obtained by the volume rendering in FIG. 2.

Step 411 reads the selected two-dimensional projected image into the composition means (300 in FIG. 2).

Step 412 converts the two-dimensional projected image thus read into the RGB data by means of the color map information of the header or the like.

Step 413 records a front-to-back order of each pixel of the two-dimensional projected images thus read in using the representative display surface depth (Z buffer) values, each obtained for each pixel of the two-dimensional projected images as a table.

The representative display surface depth values are obtained for each of the ray tracing lines.

As a consequence, the order of the pixels is recorded for each two-dimensional projected image as counted from the projection plane on the respective pixel coordinate of the composed image.

Figure 9:
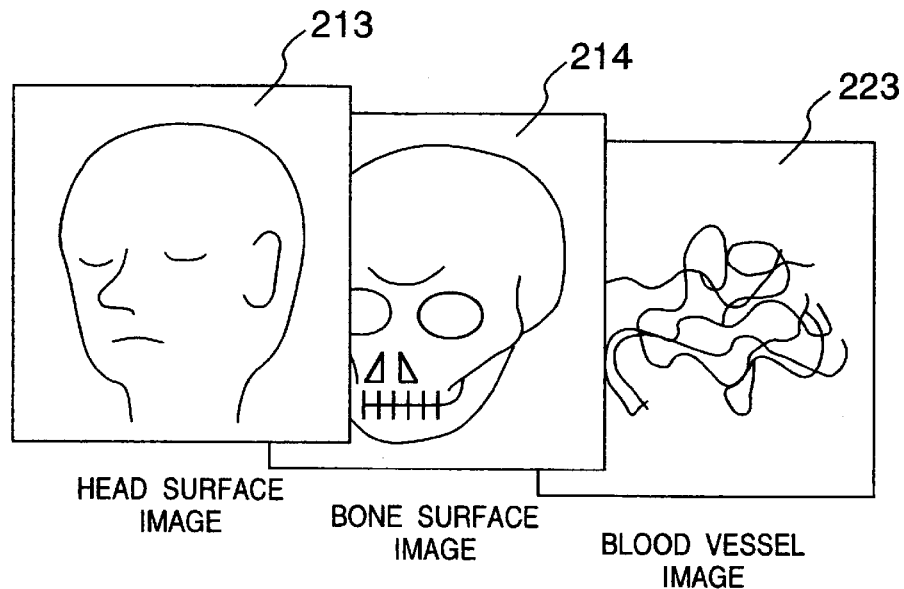
FIG. 9 is a diagram showing a three-dimensional image of an object to be composed and displayed according to an embodiment of the invention.

FIG. 9 shows some specific examples of images composed and displayed.

It is assumed that a two-dimensional projected image 213 is a head image, a two-dimensional projected image 214 is a bone image, and a two-dimensional projected image 223 is a blood vessel image.

Figure 10:
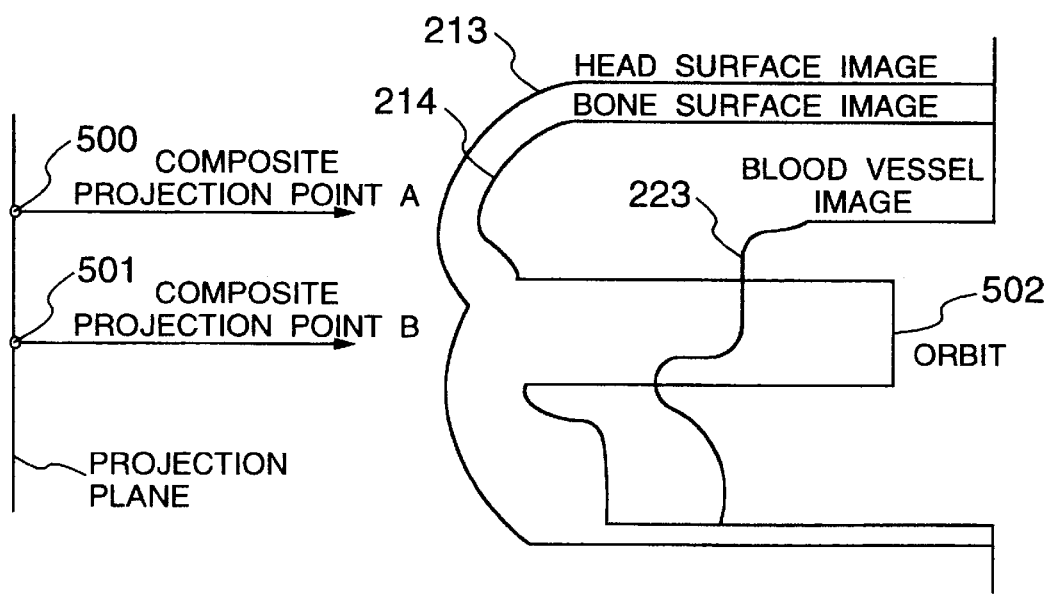
FIG. 10 is a diagram showing the change of the representative display surface depth (Z buffer) value on a line parallel with a vertical axis passing the orbit position in FIG. 9.

FIG. 10 shows the manner in which the representative display surface depth (Z buffer) value changes along a line parallel with the ordinate at the orbit position in FIG. 9.

In this case, too, the two-dimensional projected image 213 is assumed to be the representative display surface depth (Z buffer) value of the head, the two-dimensional projected image 214 to be the representative display surface depth (Z buffer) value of the bone, and the two-dimensional projected image 223 to be the representative display surface depth (Z buffer) value of the blood vessel. Further, the skull orbit in the vicinity of the composed projection point B501 is designated as 502.

Figure 11:
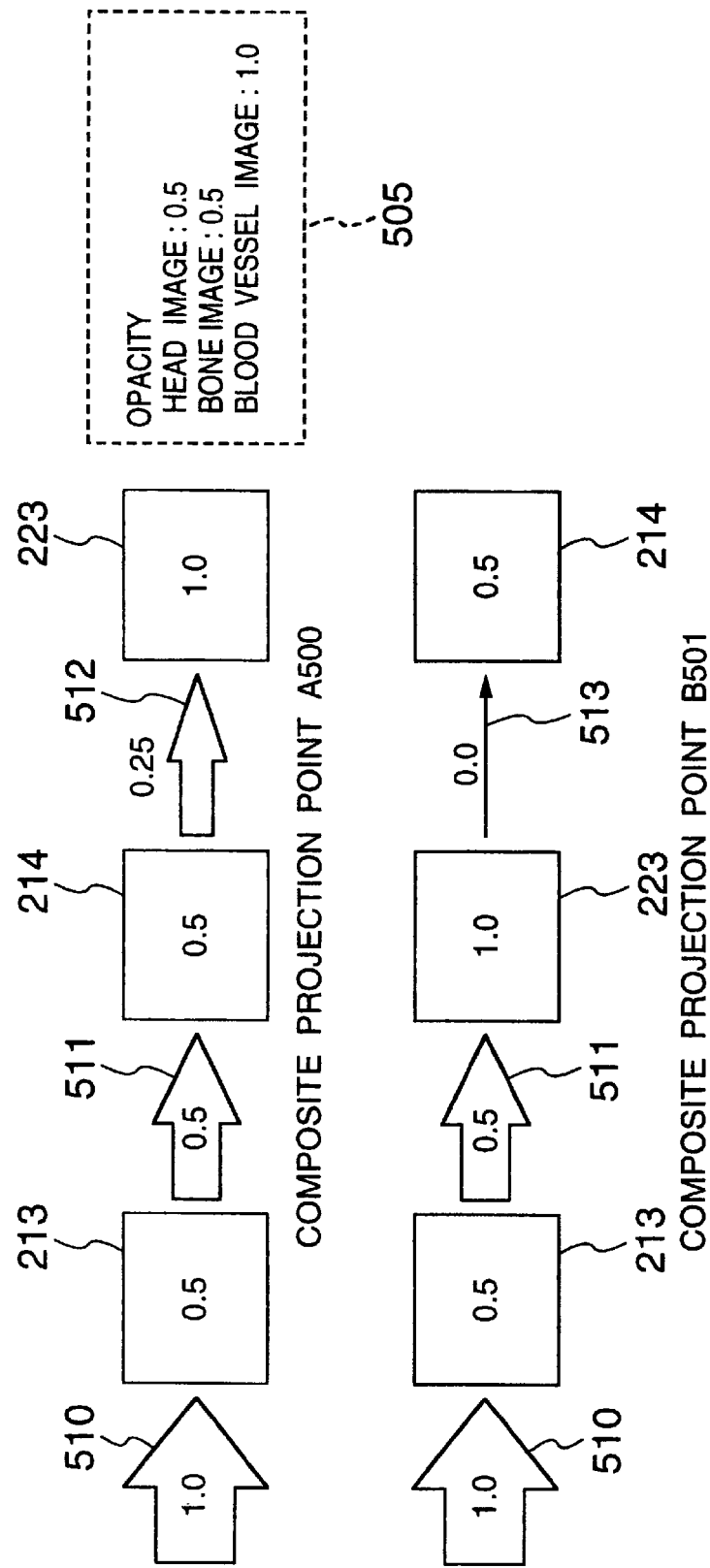
FIG. 11 is a diagram for explaining the process of light amount attenuation at the time of image composition computation in FIG. 10.

FIG. 11 shows an example process of light amount attenuation during composition and display processing. A virtual light source is placed at the projection point, from which the light is assumed to enter the two-dimensional projected image.

The opacity degree of the head image 213 is assumed to be 0.5, the opacity degree of the bone image 214 to be 0.5, and the opacity degree of the blood vessel image 223 to be 1.0.

At the composed projection point A500, first, the initial value 1.0 of the light quantity 510 changes to the light quantity 511 of 0.5 (=1.0−0.5) as the light passes through the head image 213 with the opacity of 0.5. Further, through the bone image 214 of 0.5 in opacity degree, the light quantity 512 after passage therethrough changes to 0.25 (=0.5×(1.0−0.5)).

At the composed projection point B500, on the other hand, as in the case of the composed projection point A501, the initial value 1.0 of the light quantity 510 is changed to 0.5 (=1.0−0.5) as the light quantity 511 after passage through the head image 213 having an opacity of 0.5. With the composed projection point B500 constituting the orbit 502 where the blood vessel image 223 is more in the foreground than the bone image 214, the light passes through the blood vessel image 223 having the opacity degree of 1.0. The light quantity 513 after passage through the blood vessel image 223 is given as 0.0 (=0.5×(1.0−1.0)).

The involvement or contribution of each image in the composition computation value is the product of the image luminance times the incident light quantity times the opacity value of the particular image.

The pixel value of the composed image is the total sum of the involvement value of all the two-dimensional projected images. The composed pixel value A1 of the projection point A1, for example, is expressed as A1<(luminance of image 213)×1.0×0.5+(luminance of image 214)×0.5×0.5+(luminance of image 223)×0.25×1.0. To generalize, the computation for image composition is expressed in equation 2.

$$\left.\begin{array}{l}M_R(x,y) = \sum_{n=1}^{Max} I_{Rn}(x,y) \times O_n \times \prod_{m=1}^{n} (1.0 - O_{m-1}) \\ M_G(x,y) = \sum_{n=1}^{Max} I_{Gn}(x,y) \times O_n \times \prod_{m=1}^{n} (1.0 - O_{m-1}) \\ M_B(x,y) = \sum_{n=1}^{Max} I_{Bn}(x,y) \times O_n \times \prod_{m=1}^{n} (1.0 - O_{m-1})\end{array}\right\} \quad \text{Equation 2}$$

where n is natural numbers 1, 2, . . . , N sequentially increased from the one nearest to the projection plane, $M_R(x,y)$ is the composition result (red component) of the coordinate (x,y), $M_G(x,y)$ is the composition result (green component) of the coordinate (x,y), $M_B(X,y)$ is the composition result (blue component) of the coordinate (x,y), $I_{Rn}(x,y)$ is the luminance value (red component) of the nth image in the coordinate (x,y), $I_{Gn}(x,y)$ is the luminance value (green component) of the nth image in the coordinate (x,y), $I_{Bn}(x,y)$ is the luminance value (blue component) of the nth image in the coordinate (x,y), $O_n$ is the opacity degree of the nth image, and $O_0$ is assumed to be 0.

It should be noted that the image designated by n is varied among different composite projection points. In FIG. 10, the image of n=2 is the bone surface image 214 at the composite projection point A and the blood vessel image 223 at the composite projection image point B.

Figure 12:
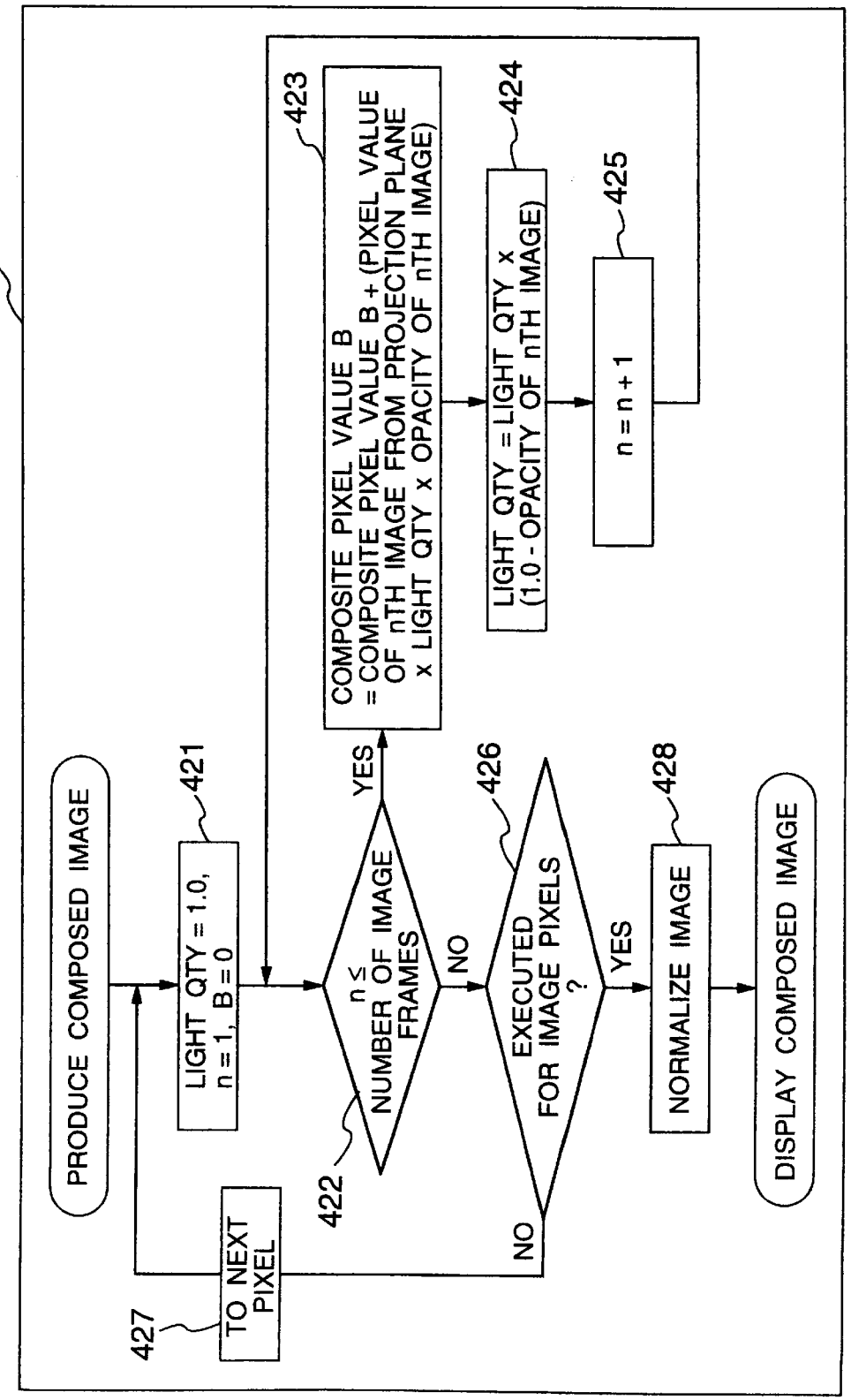
FIG. 12 is a flowchart showing the routine for executing the image composition according to an embodiment of the invention.

FIG. 12 is a flowchart showing the routine for executing the process of image composition. The flowchart of FIG. 12 is performed after the flowchart of FIG. 8. Numeral 420 designates a part of the recording medium for storing the processing program of FIG. 12.

Step 421 substitutes the initial value for composition computation for the composed image of interest. More specifically, this step sets the light quantity A=1, the value n=1 for specifying an image of interest and the pixel value B=0 of the composition computation result.

Step 422 decides on the condition for terminating the sum computation, and steps 423 to 425 are repeated by the number of image frames. This repetitive operation is performed from the image nearest to the projection plane in the sequence determined by comparing the representative display surface depth (Z buffer) value of each image.

Step 423 determines the degree to which the pixel value of each image is involved in the composition computation value, and adds the resulting involvement value to the composition computation value B determined by the previous repetitive operations. A new composition pixel value B thus is obtained.

The involvement value of a given image is expressed as (pixel value of the image)×(light quantity that has reached the image)×(opacity degree of the image).

The farther an image is located from the projection plane, the greater is the light quantity reaching the image attenuated from the initial value of 1.0 due to the opacity of the images located nearer to the projection plane, as determined in step 424. Step 423 is repeated the number of times equal to the number of image frames for producing the final composite pixel value B.

Step 424 computes the light quantity attenuated by an image involved as follows:

Light quantity attenuation=light quantity×(1.0−opacity degree of the particular image).

Step 425 transfers to the next image as an image involved, and the process returns to step 422.

Step 426 decides on the termination of the image composition computation. In the case where the image composition computation is not yet terminated, the process proceeds to step 427. If the image composition computation is terminated, on the other hand, the process is passed to step 428.

Step 427 transfers the point of interest to the next pixel for composition computation, and the process returns to step 421.

Step 428 normalizes the image for displaying the result of image composition (image synthesis) computation.

This composition computation is executed upon generation of a change event of the opacity change slider 331 (FIG. 6) corresponding to each two-dimensional projected image and also upon generation of a composition (synthesis) computation event 350 (FIG. 6), with the result thereof being displayed on the image composite window 301 (FIG. 6).

Figure 13:
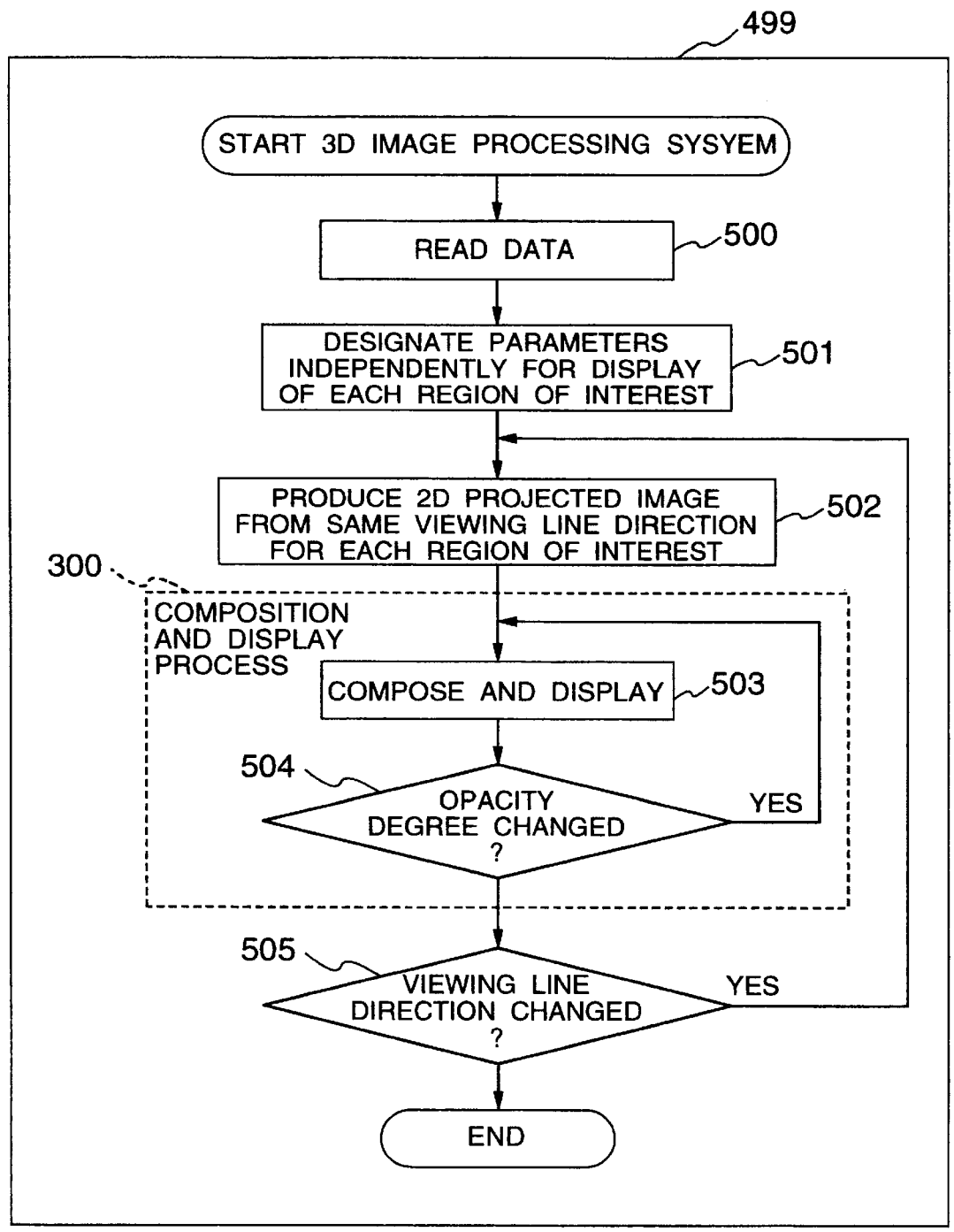
FIG. 13 is a flowchart for performing the image composition and display function including the change of the viewing line direction according to an embodiment of the invention.

FIG. 13 is a flowchart for the composition and display function including the designation of the direction of the viewing line. Numeral 499 designates a recording medium for storing the program for executing the processing of FIG. 13. In the recording medium, the flowcharts of FIGS. 2, 7, 8, 12 are included.

Step 500 reads the three-dimensional data to be subjected to composition computation.

Step 501 sets, independently for each region of interest, such parameters as the threshold value for region display, the opacity for volume rendering, the region extracted for display and the color (RGB ratio) with respect to the three-dimensional data read in.

The X-ray CT data will be explained as an example. The color is set to the flesh color with the CT threshold value of −300 or more for skin display, the color is set to white with the CT threshold value of 200 or more for bone display with, and the color is set to red by extracting a blood vessel region in advance for blood vessel display.

Step 502 produces a two-dimensional projected image for each region of interest by volume rendering of FIG. 2 from the same direction of the viewing line, and transfers the result to the composition and display step 300 (FIG. 2).

Step 503 composes an image from the result of step 502 through the steps of the flowchart of FIG. 12.

Step 504 repeats the process of image composition of step 502 with the parameters which may be obtained after a change, if any, of the opacity degree of each two-dimensional projected image.

Step 505 returns the process to step 502 in the case where the direction of the viewing line is changed, and a two-dimensional projected image is produced along the direction of the viewing line for each region of interest, thereby repeating the image composition.

The composition result is obtained from an arbitrary direction of the viewing line by means of the steps included in this flowchart.

Figure 14:
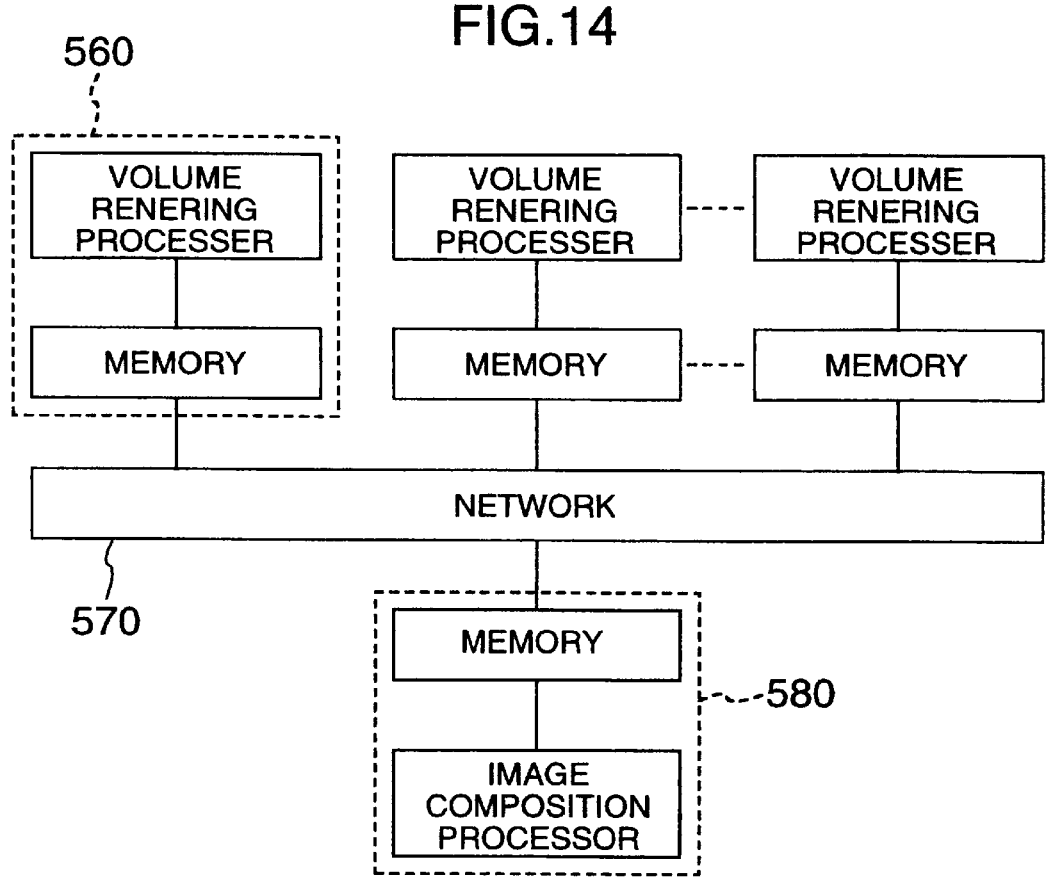
FIG. 14 is a diagram for explaining a parallel processor according to an embodiment of the invention.

An increased speed of image composition including the change in the direction of the viewing line is made possible by a parallelization as shown in FIG. 14.

The volume rendering processing for each region of interest is shared among several processors connected to a network 570, and a volume-rendered image is produced in parallel. The resulting image is transferred to a specified image composition processor 580 to produce a composed image. In the process, each volume rendering processor sequentially transfers partial regions of each projected image on which the rendering is complete to an image composition processor 580, which is adapted to compose an image from the partial regions carrying sufficient data on the particular image. As a result, a composed image can be obtained in a time equal to the sum of the time most required for determining the volume-rendered image of a region of interest, the time for transferring the image and the image composition and display time.

(Embodiment 2)

A second embodiment is described with reference to the case in which an image is composed from three-dimensional vector data and a two-dimensional projected image (with Z buffer) thereof. Assume that before producing an artificial blood vessel or an artificial bone, the three-dimensional vector (CAD) data of the artificial blood vessel or the like is composed and displayed on a two-dimensional projected image of the three-dimensional data on the image measured by CT or MRI. As a consequence, the adaptation of an artificial object such as the artificial blood vessel or the artificial bone to an application point can be simulated.

Figure 15:
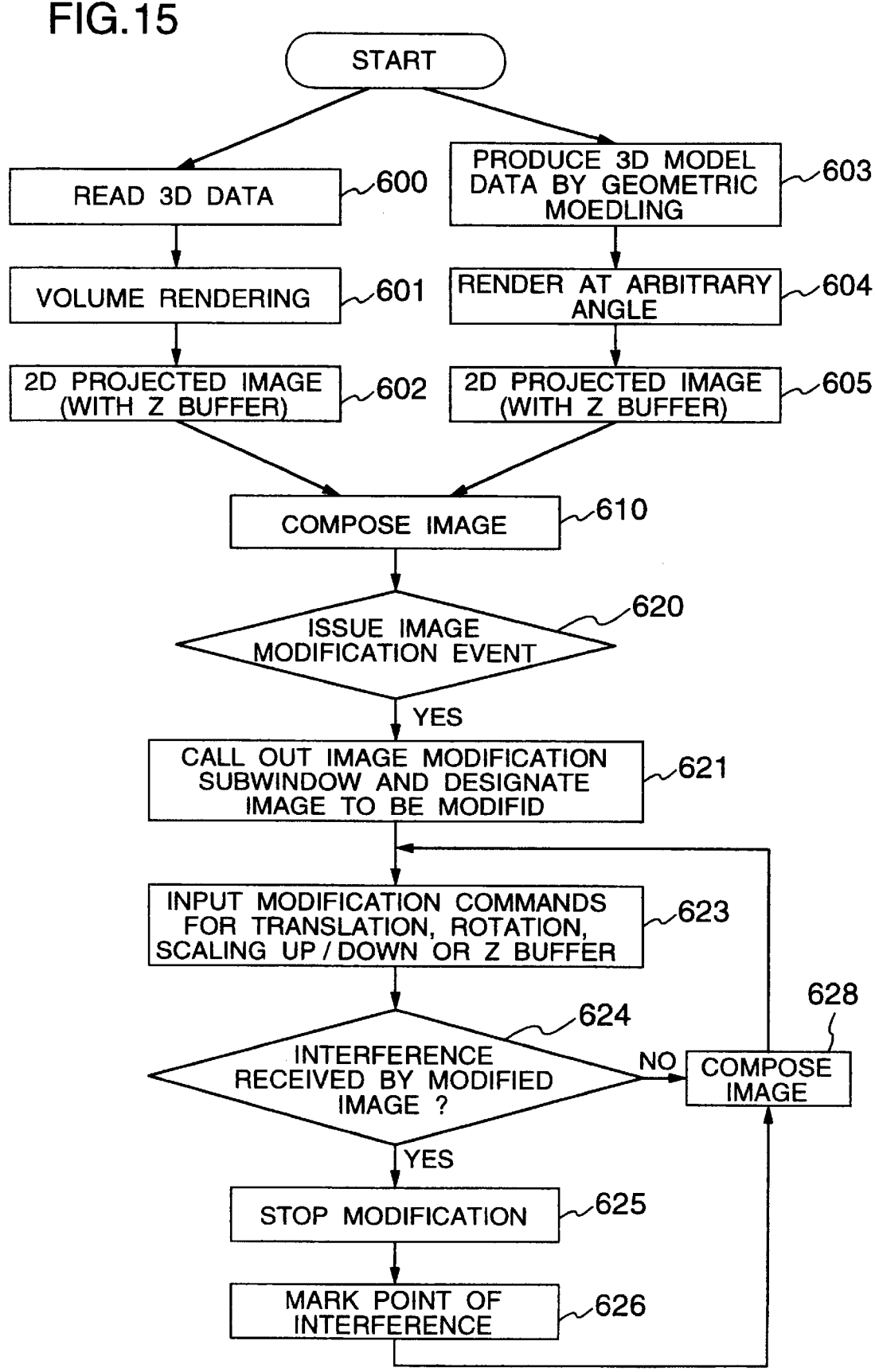
FIG. 15 is a flowchart for composing an image from CAD data and three-dimensional data including the modification according to another embodiment of the invention.

FIG. 15 shows a flowchart for composing three-dimensional vector data and three-dimensional data.

Steps 600 to 602 read the three-dimensional data and produce a plurality of two-dimensional projected images with Z buffer by the volume rendering of FIG. 2.

Step 603 models the shape by means of a three-dimensional CAD or the like and thus produces three-dimensional vector data.

Step 604 renders the data of step 603 from the direction of the viewing line in which the volume rendering operation is performed in step 601. At the same time, the representative display surface depth (Z buffer) value is also computed.

Step 605 produces a two-dimensional projected image with Z buffer.

Step 610 produces a image by composition as in the case of FIG. 12.

Steps 620 to 628 deal with the functions of image modification or transformation, interference check or the like. The modification includes the translation, rotation, scale up/down and the change of the representative display surface depth (Z buffer) value.

In the case where it is desired to correct or relocate the composed image obtained at step 610, a modification event command is input by means of a push button (380 in FIG. 6).

Step 620 checks to see whether the modification event command is has been input or not.

Step 621 calls an image modification subwindow, and designates as an image to be modified out of two-dimensional projected images obtained at steps 602 and 605.

Step 623: the user inputs a modification command for translation, rotation, scale up/down or the change of the representative display surface depth (Z buffer) value.

Step 624 makes computations required for modification of an image to be modified, and checks to see whether there is any interference by comparing the result of step 623 with the two-dimensional projected images other than those to be modified.

Steps 625 to 626 stops the modification process in the case where the result of step 624 shows an interference, and marking the point interfered, passes the process to step 628.

Step 628 composes an image by combining an image to be modified with an image not to be-modified through the flow of operations shown in FIG. 12, followed by proceeding to step 623 for continuing the modification processing.

Figure 16:
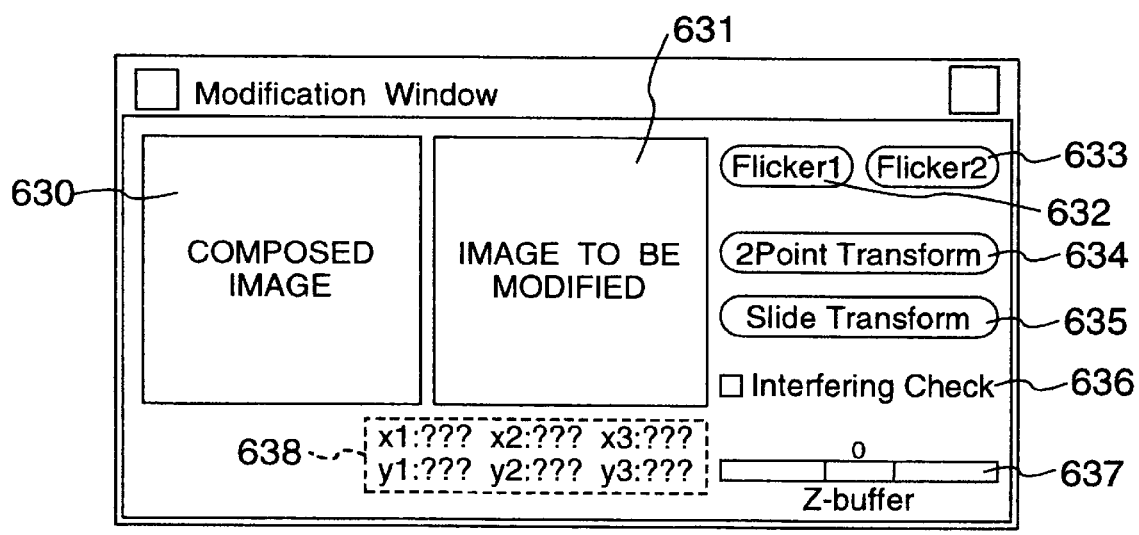
FIG. 16 is a configuration diagram of a modification subwindow according to another embodiment of the invention.

FIG. 16 shows modification subwindows. A window 630 displays the composed image obtained at step 610 or 628. A window 631 displays a two-dimensional projected image to be modified. A push-button 632 is for displaying by flicker the images to be modified and those not to be modified, alternately, on the window 631. A push-button 633 is for displaying by flicker an image before modification and an image after modification on the window 631. A push-button 634 is to issue an event designating the scale up/down or rotation. A push-button 635 is for issuing an event designating the parallel translation.

The push-buttons 634, 635 perform the function of switching the parameters to be designated in order to designate a point in the window 631 and also parameters related to the modification.

A toggle button 636 switches whether an interference check is performed or not. A slider 637 designates a uniform amount by which the representative display surface depth (Z buffer) value of modified images is changed.

A label 638 displays modification parameters in numerical values.

Figure 17B:
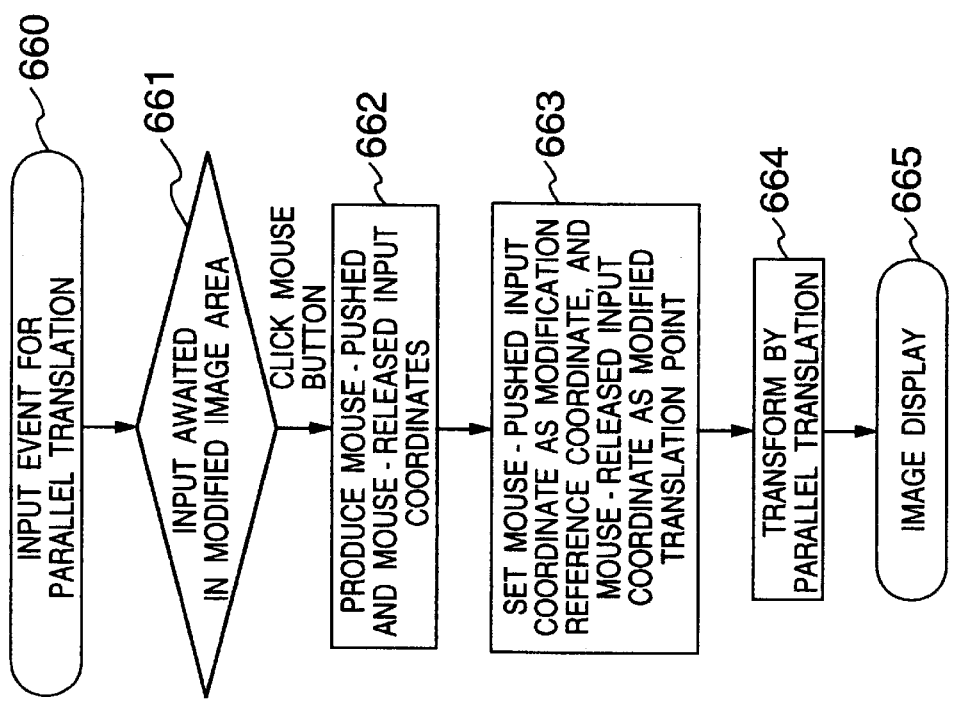
FIGS. 17A, 17B are flowcharts showing the modification functions according to another embodiment of the invention.
Figure 17A:
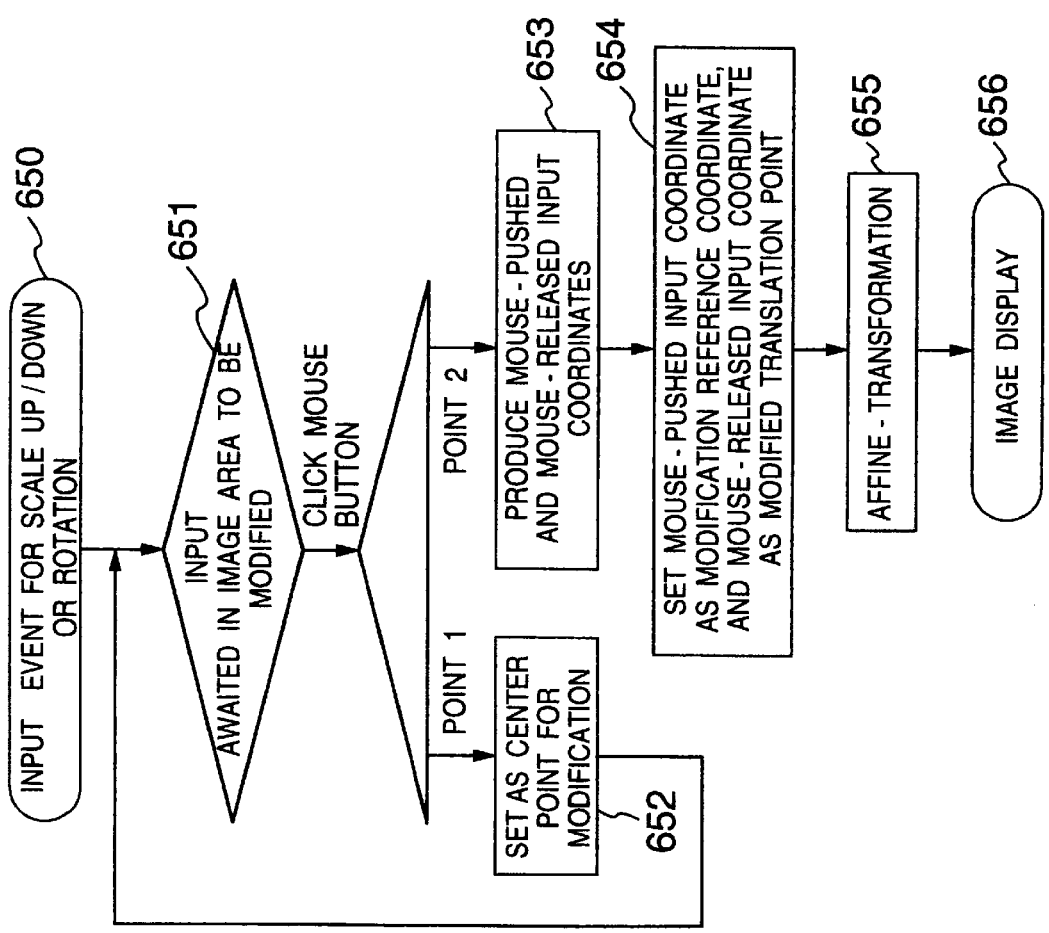

FIGS. 17A, 17B show modification flowcharts. In particular, FIG. 17A is a flowchart for scale up/down and rotation, and FIG. 17B that for parallel translation. This modification retains the front-to-back order in applications to the representative display surface depth (Z buffer) value as well as in applications to the volume-rendered image by a similar operation.

Step 650 initiates this routine in response to an event for scaling up or rotation.

Step 651 initiates the state waiting for a mouse event input within a modified image.

Assuming that a mouth event in the modified image region is the first point, step 652 sets the coordinate of the particular mouse event as the center point of modification.

In the case where a mouth event in the modified image region is the second one, step 653 produces a mouse-pushed coordinate and a mouse-released coordinate.

Step 654 sets the coordinate mouse-pushed at step 653 as a modification reference coordinate and the mouse-released coordinate as a coordinate point associated with the modified reference coordinate.

Step 655 performs affine-transformation on the basis of the modified parameters obtained at steps 652 to 654.

Step 656 displays a modified image on the modified image region and waits for the next modification command.

Step 660 initiates the routine for parallel translation in response to a parallel translation event.

Step 661 initiates the state waiting for a mouse event input in the modified image region.

When a mouse event is generated in the modified image region, step 662 produces a mouse-pushed coordinate and a mouse-released coordinate.

Step 663 sets the coordinate mouse-pushed at step 662 as a modification reference coordinate and a mouse-released coordinate as a coordinate point associated with the modified reference coordinate.

Step 664 performs parallel translation on the basis of the modified parameters obtained at steps 652 to 653.

Step 665 displays the modified image in the modified image region and waits for the next modification command.

An image transformation is commanded in dialog in the manner described above.

(Embodiment 3)

Figure 18:
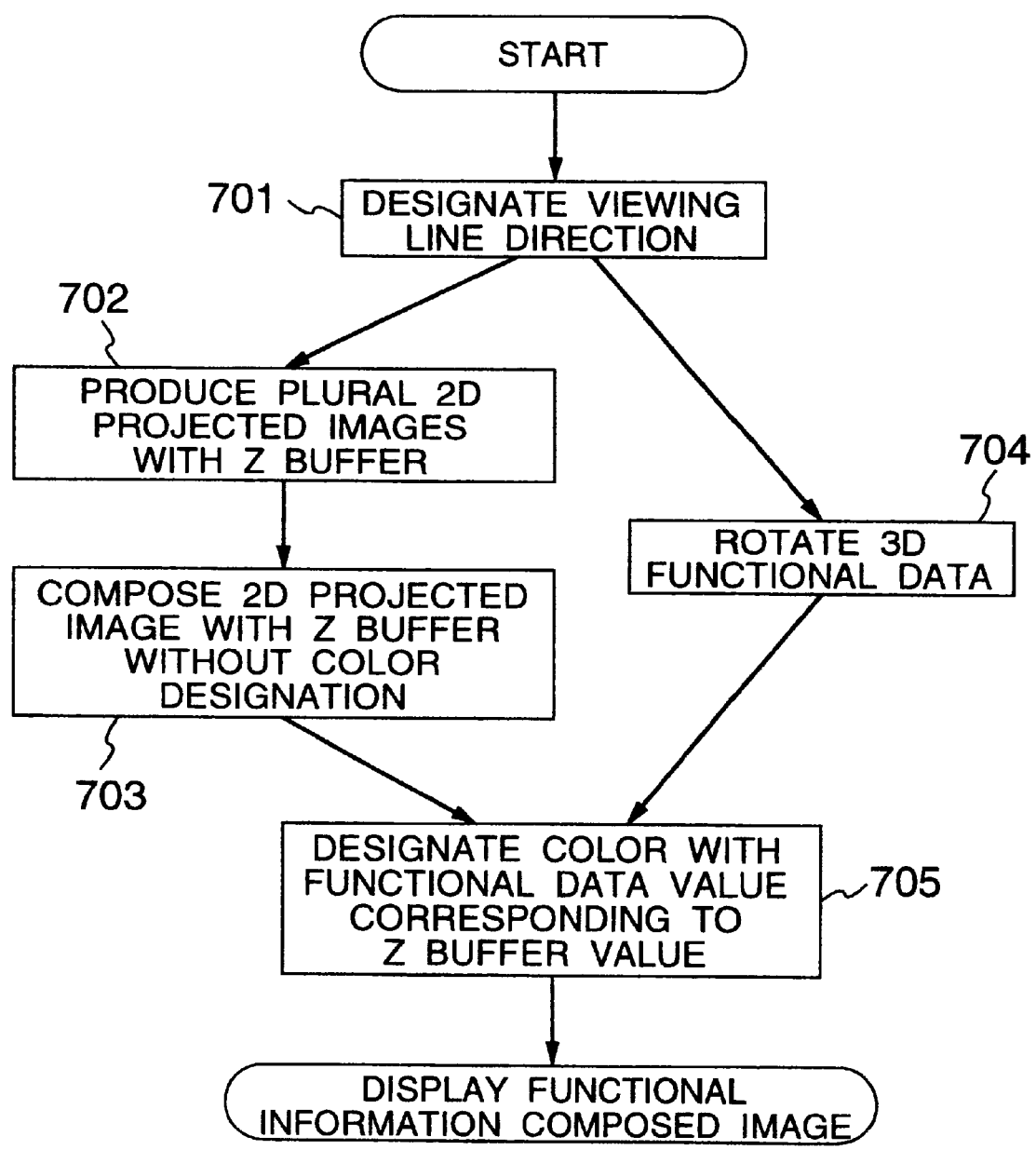
FIG. 18 is a flowchart for composing an image from three-dimensional functional data and three-dimensional geometric data according to another embodiment of the invention.

The third embodiment refers to the composition and display of the three-dimensional geometric data representing the anatomical information obtained by MRI, X-ray CT or the like and the three-dimensional functional data representing the active tissue conditions obtained by emission CT or the like. The respective data are assumed to have been positionally adjusted. It is also assumed that the three-dimensional functional data are stored in memory and a table is prepared for relating each value of the three-dimensional functional data to a predetermined color. A flowchart representing the operation is shown in FIG. 18.

Step 701 designates the direction of the viewing line for volume rendering.

Step 702 performs the volume rendering of FIG. 2 for a plurality of regions of interest of a plurality of three-dimensional data from the direction of the viewing line designated at step 701, and thus produces a plurality of two-dimensional projected images with Z buffers.

Step 703 combines the two-dimensional projected images produced at step 702 and thus produces a composed two-dimensional projected image with Z buffers not designated in color. Each of the Z buffer is a maximum value of a plurality of representative display surface depth values used for calculating a pixel value of the composed image.

Step 704 rotates the three-dimensional functional data on memory space in the direction of the viewing line designated at step 701.

Step 705 determines the coordinate and value of the three-dimensional functional data obtained at step 704 associated with the position expressed by the Z buffer obtained at step 703, sets the designated color as the color of the corresponding pixels of the composed image, and thus produces a composed two-dimensional projected image with functional data.

As described above, the composition and display of a plurality of three-dimensional data and three-dimensional functional data is made possible.

(Embodiment 4)

Figure 19:
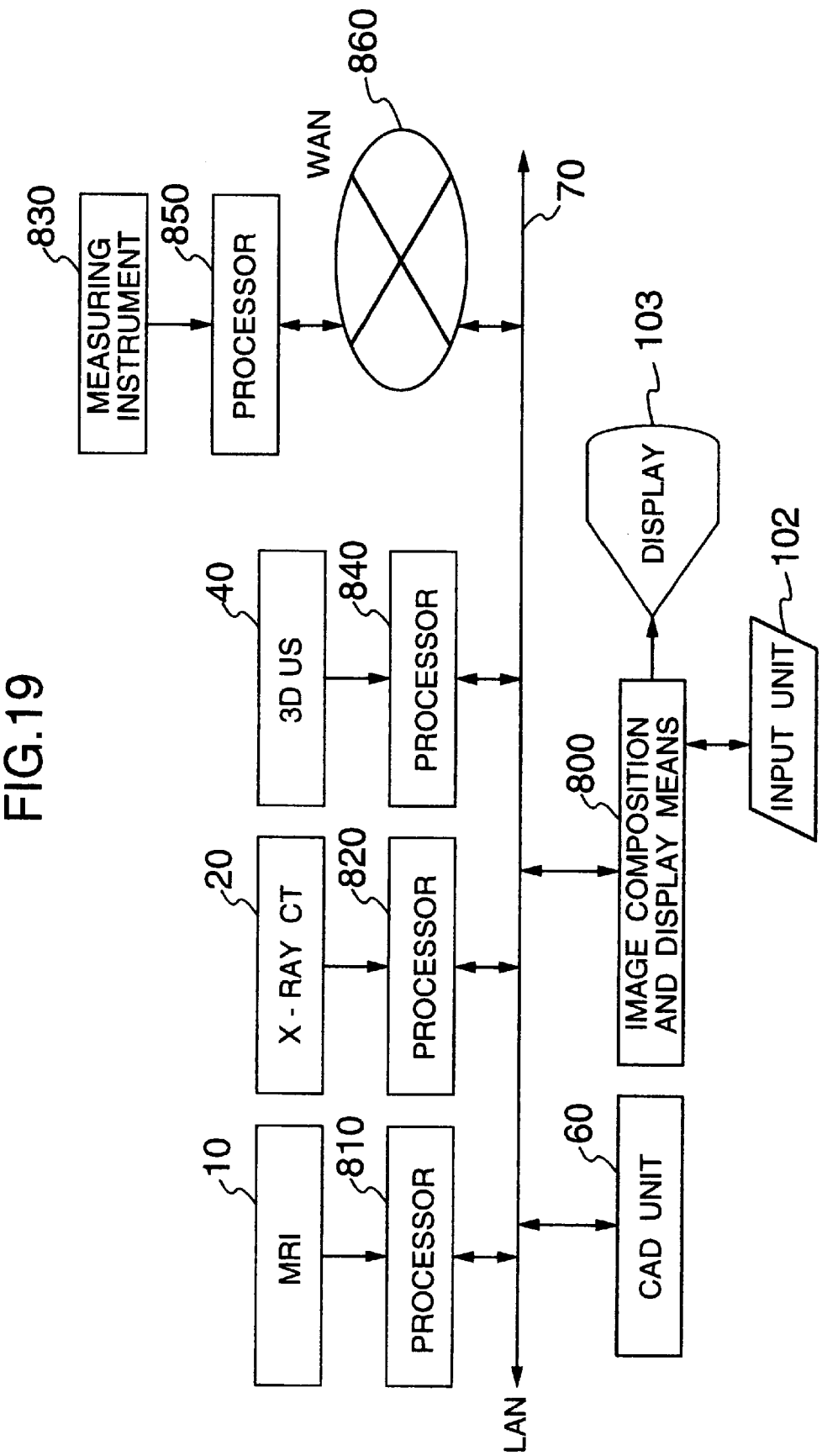
FIG. 19 is another configuration diagram showing a three-dimensional image composition and display system to which the invention is applied.

This embodiment deals with multi-modality image composition. An example of a system configuration is shown in FIG. 19.

The three-dimensional data measured by an X-ray CT unit 20 is transferred to a processor 820 connected directly to the measuring instrument.

In similar fashion, the three-dimensional data measured by an MRI unit 10, a 3D ultrasonic diagnosis unit 40 and another measuring instrument 830 are transferred to processors 810, 840 and 850 connected directly to the measuring instruments respectively.

The respective data thus transferred are registered with the processors and set to a common coordinate system.

Each processor is connected to an image composition and display unit 800 through a LAN 70 or a WAN 860. The image composition and display unit 800 includes a display unit 103 for displaying the image composition and an input unit 102.

Figure 20:
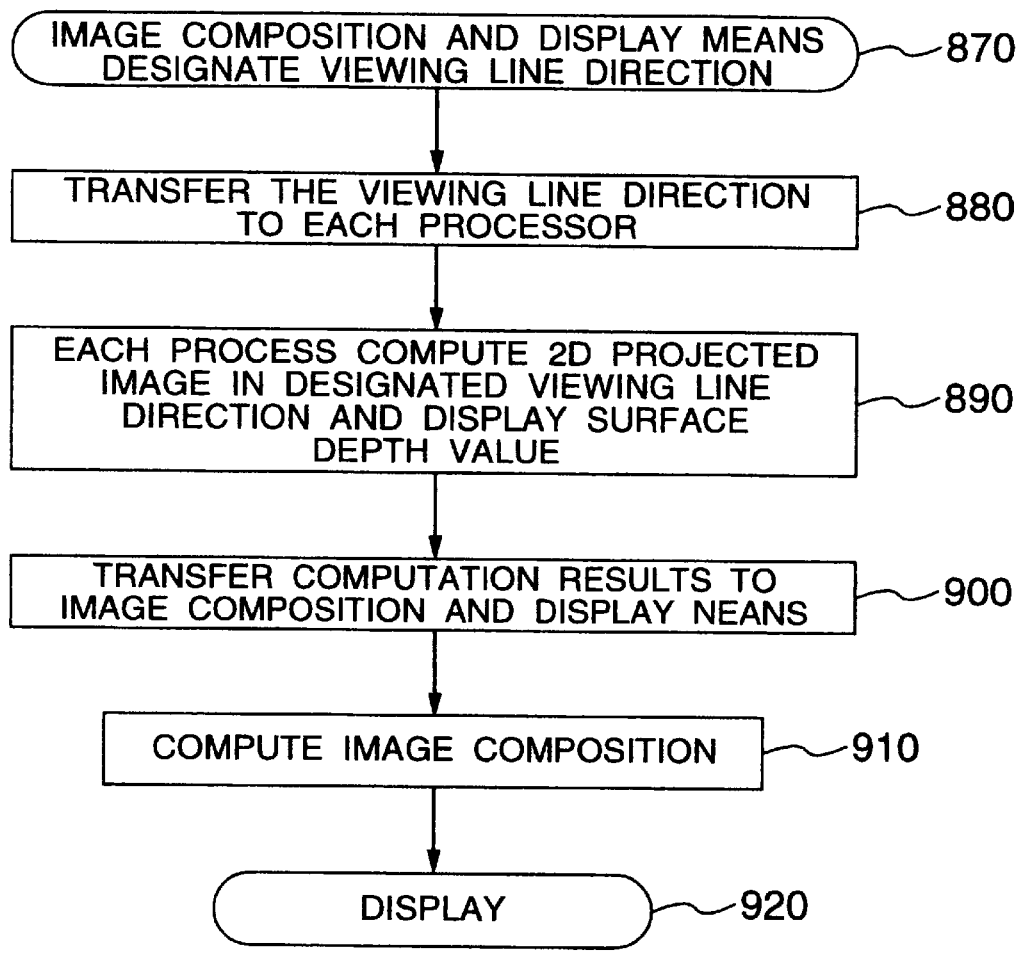
FIG. 20 is a flowchart showing the image composition and display function according to another embodiment of the invention.
Figure 21:
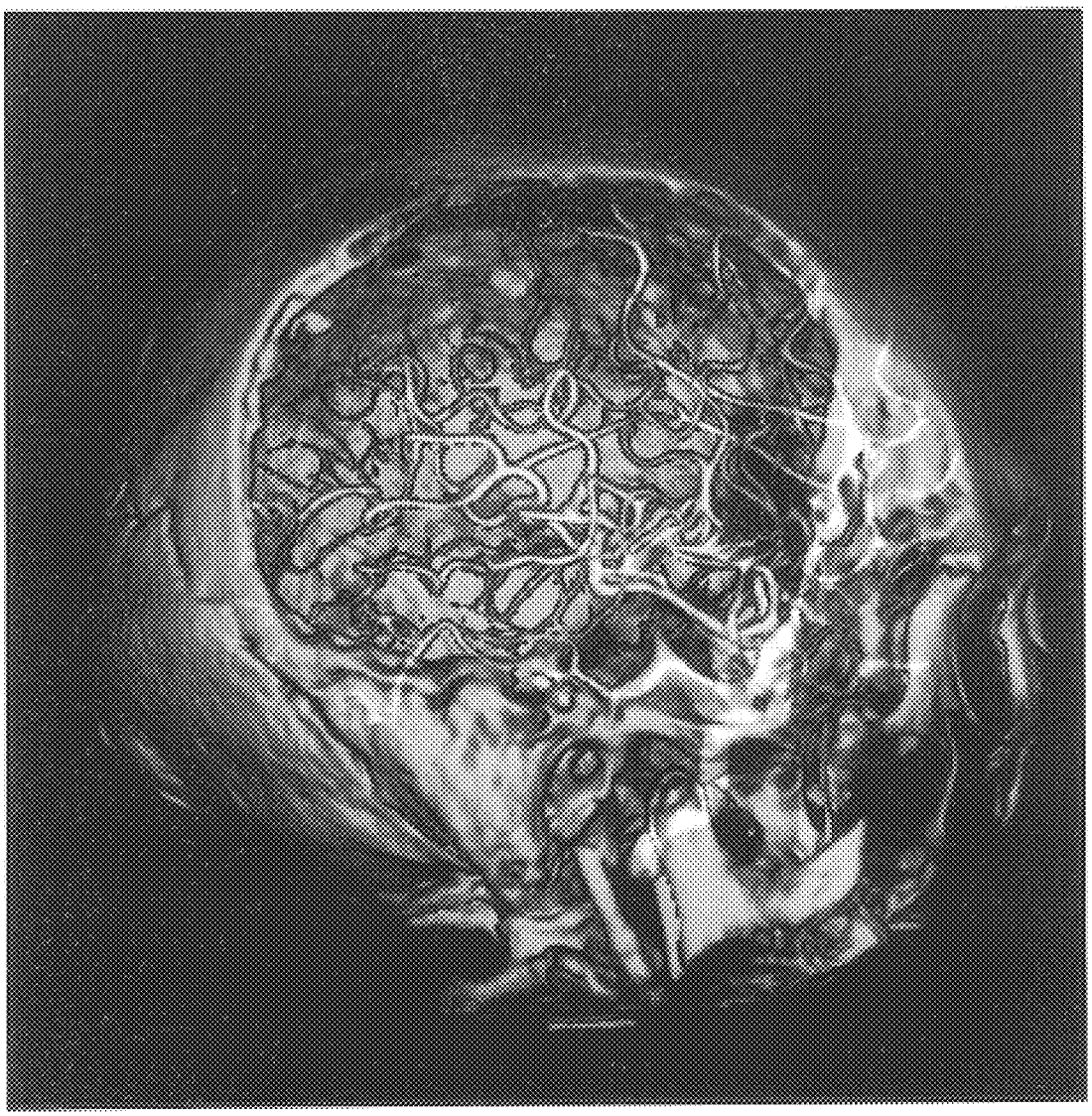
FIG. 21 shows an example composed image according to the present invention.

FIG. 20 is a flowchart for image composition and display applied to the configuration example of FIG. 19. Step 870 causes the image composition and display unit 800 to designate the direction of the viewing line.

Step 880 transfers the parameter of the viewing line direction designated at step 870 through the LAN 70 and the WAN 860 to the processors 810, 820, 840, 850 having three-dimensional data intended to be composed.

Step 890 causes the processor 810, 820, 840, 850 to perform the volume rendering operation and compute a two-dimensional projected image and a representative display surface depth (Z buffer) value for each region of interest set on the three-dimensional data in the same manner as in the first embodiment on the basis of the parameters of the viewing line direction transferred at step 880.

Step 900 transfers the two-dimensional projected images and the representative display surface depth (Z buffer) values computed at step 890 to the image composition and display unit 800.

Step 910 causes the image composition and display unit 800 to perform the computations for image composition with reference to the flowchart of FIG. 12 on the basis of the data transferred from the respective processors (step 900).

Step 920 displays the result of image composition at step 910 on the display unit 103.

Since certain changes may be made in the above apparatus and method without departing from the scope of the invention herein involved, it is intended that all matter contained in the above description or shown in the accompanying drawings shall be interpreted as illustrative and not in a limiting sense.

We claim:

1. A three-dimensional composed image display apparatus comprising memory means for storing three-dimensional volume data in a plurality of three-dimensional arrangements, a processor for processing said data, display means for displaying results of the processing, and means for permitting a user to input positional information on the display means into said processor;

said three-dimensional composed image display apparatus further comprising:

means for computing a two-dimensional projected image by a volume rendering scheme in which a plurality of voxel values on a same ray tracing line are caused to involve in a projection value for a region of interest set on said three-dimensional volume data;

means for determining a single representative display surface depth value on said ray tracing line from depth values of said voxels involved in said projection value; and means for composing and displaying two-dimensional projected images using a plurality of two-dimensional projected images computed by said computing means and the representative display surface depth values, each obtained for each pixel of said two-dimensional projected images by said representative display surface depth determining means;

wherein said means for determining the single representative display surface depth value includes means for selecting a voxel depth value representing a maximum amount of involvement as the single representative display surface depth value out of voxels involved in the display on said ray tracing line.

2. A three-dimensional composed image display apparatus according to claim 1, wherein said means for composing and displaying a plurality of two-dimensional projected images includes:

means for recording a front-to-back order of each pixel of said two-dimensional projected images corresponding to each projection point using said representative display surface depth values; and means for determining a priority of display for each pixel of said two-dimensional projected images.

3. A three-dimensional composed image display apparatus according to claim 1, wherein said means for composing and displaying a plurality of two-dimensional projected images includes means for permitting the user to input and set an opacity degree for each of the two-dimensional projected images to be composed.

4. A three-dimensional composed image display apparatus according to claim 1, wherein said means for composing and displaying a plurality of two-dimensional projected images includes:

a color map table corresponding to each of the two-dimensional projected images to be composed for setting luminance values of each of said two-dimensional projected images; and means for inversely setting the color map table collectively with respect to a predetermined value.

5. A three-dimensional composed image display apparatus according to claim 1, further comprising means for computing a two-dimensional projected image with representative display surface depth information by the volume rendering scheme from three-dimensional vector data;

wherein said means for composing and displaying a plurality of two-dimensional projected images includes means for composing a two-dimensional projected image obtained from said three-dimensional volume data and a two-dimensional projected image obtained from said three-dimensional vector data.

6. A three-dimensional composed image display apparatus according to claim 1, wherein said means for composing and displaying a plurality of two-dimensional projected images includes:

means for modifying the two-dimensional projected image on the basis of a modification command from the user; and means for displaying a two-dimensional projected image after said modification.

7. A three-dimensional composed image display apparatus according to claim 6, wherein said means for composing and displaying a plurality of two-dimensional projected images includes:

a first display section for displaying an image obtained by composition; and a second display section arranged adjacently to said first-display section for displaying a two-dimensional projected image to be modified.

8. A three-dimensional composed image display apparatus according to claim 6, wherein said means for composing and displaying a plurality of two-dimensional projected images includes means for displaying by flicker a two-dimensional projected image to be modified and a two-dimensional projected image not to be modified on the same display section.

9. A three-dimensional composed image display apparatus according to claim 6, wherein said means for composing and displaying a plurality of two-dimensional projected images includes means for displaying by flicker a two-dimensional projected image after said modification and a two-dimensional projected image before said modification on the same display section.

10. A three-dimensional composed image display apparatus according to claim 6, wherein said modification means includes means for performing selected one of operations including a translation, rotation, scaling up, scaling down and changing of the representative display surface depth value of the two-dimensional projected image.

11. A three-dimensional composed image display apparatus according to claim 1, wherein said means for composing and displaying a plurality of two-dimensional projected images includes:

means for modifying the representative surface display depth value of an arbitrary two-dimensional projected image uniformly; and means for composing and displaying said two-dimensional projected image using a representative surface display depth value after modification.

12. A three-dimensional composed image display apparatus according to claim 1, further comprising:

memory means for storing three-dimensional functional data;

means for assigning a color to each value of said three-dimensional functional data; and means for determining on memory space a coordinate of interest of said three-dimensional functional data corresponding to each pixel of a composed image obtained by said composing-displaying means on the basis of said composed image and said representative display surface depth values; and means for designating a color set to a value of said three-dimensional functional data of the coordinate of interest as a color of a corresponding pixel of said composed image and thereby constituting a functional composed image.

13. A three-dimensional composed image display apparatus according to claim 1, wherein said computing means includes a plurality of independent processor means for computing said two-dimensional projected images for each said region of interest.

14. An image composition and display system comprising:

a plurality of processors corresponding to a plurality of modalities respectively;

a network interconnecting said processors; and image composition and display means connected to said network;

wherein each of said processors includes:

first computing means for registering image data in a common coordinate system;

second computing means for computing a two-dimensional projected image by a volume rendering scheme in which a plurality of voxel values on a same ray tracing line are involved in a projection value for a three-dimensional volume rendering; and means for determining a single representative display surface depth value on said ray tracing line from said voxel depth values involved in said projection value; and means for transferring results of processing said three-dimensional volume data through said network to said image composition and display means;

wherein said image composition and display means includes means for composing and displaying a multi-modality image from said results of processing said three-dimensional volume data; and wherein said means for determining the single representative display surface depth value includes means for selecting a voxel depth value representing a maximum amount of involvement as the single representative display surface depth value out of voxels involved in the display on said ray tracing line.

15. A recording medium for storing the following code sections as a program capable of being read and executable by computer:

a code section for reading three-dimensional data to be computed for composition;

a code section for receiving and setting a parameter input command for displaying each of regions of interest with respect to said three-dimensional data read;

a code section for producing two-dimensional projected images from a same direction of a viewing line for each of said regions of interest by a volume rendering;

a code section for determining a single representative display surface depth value for each pixel of said two-dimensional projected images on each ray tracing line from voxel depth values involved in a projection value;

a code section for determining degrees to which each pixel of said computed two-dimensional projected images is involved in a display at a projection point by judging afore and aft relation of said pixels of said two-dimensional projected images using said two-dimensional projected images and said representative display surface depth values;

a code section for determining a pixel value of said projection point by taking a total sum of said degrees of display involvement;

a code section for determining pixel values of a projection plane by taking the total sum of said degrees for each projection point and thereby composing and displaying two-dimensional projected images;

a code section for modifying opacity degrees of said two-dimensional projected images; and a code section for issuing a command to receive a modification in a direction of the viewing line and produce new two-dimensional projected images from the direction of the viewing line after modification;

wherein said code section for determining the single representative display surface depth value includes a code section for selecting a voxel depth value representing a maximum amount of involvement as the single representative display surface depth value out of voxels involved in the display on said ray tracing line.

16. In a three-dimensional composed image display apparatus comprising memory means for storing three-dimensional volume data including a plurality of three-dimensional arrangements, at least a processor for processing said data, display means for displaying processing results, and means for permitting a user to input positional information on said display means, an image composition method comprising the steps of:

reading three-dimensional volume data on a memory space;

setting a plurality of regions of interest on said three-dimensional volume data read and setting parameters required for displaying each region of interest;

computing a plurality of two-dimensional projected images corresponding to each region of interest by a volume rendering scheme in which a plurality of voxel values on a same ray tracing line are involved in a projection value;

determining a single representative display surface depth value for each pixel of said two-dimensional projected images on said ray tracing line from said voxel depth values involved in said projection value;

determining degrees to which each pixel of said computed two-dimensional projected images is involved in a display at a projection point using said two-dimensional projected images and said representative display surface depth values;

determining a pixel value of said projection point by taking a total sum of said degrees of display involvement; and performing the step of determining a pixel value for each projection point and determining pixel values of the projection plane;

wherein said step of determining the single representative display surface depth value includes a step of selecting a depth value of a voxel representing a greatest degree of involvement as the single representative display surface depth value out of voxels involved in the display on said ray tracing line.

17. An image composition method according to claim 16, wherein said step of determining the degree of display involvement includes a step of:

determining on said parameters the degrees of display involvement of each pixel of said two-dimensional projected images sequentially from one near to the projection plane for each projection point while deciding on a front-to-back order of each pixel of the two-dimensional projected images using said representative display surface depth values.

18. An image composition method according to claim 17, wherein said step of determining the degree of display involvement includes a step of:

placing a virtual light source at said projection point, assuming that a light beam is incident on said two-dimensional projected images and executing the following computation:

Degree of display involvement=(pixel value of pixel A of nth two-dimensional projected image from projection plane)×(light quantity that has reached pixel A)× (opacity of nth two-dimensional projected image from projection plane)

where the nth two-dimensional projected image from the projection plane is determined for each projection point.

19. An image composition method for said image composition and display system comprising a plurality of processors corresponding to a plurality of modalities respectively, a network for interconnecting said processors and image composition processing means connected to said network, comprising the steps of:

causing said image composition processing means to designate a direction of a viewing line for each of said processors;

causing each of said processors to compute two-dimensional projected images for each of regions of interest on the basis of the designated direction of the viewing line by a volume rendering scheme in which a plurality of voxel values on a same ray tracing line are involved in a projection value;

determining a single representative display surface depth value for each pixel of said two-dimensional projected images on each ray tracing line from said voxel depth values involved in said projection value;

transferring said computed two-dimensional projected images and the representative display surface depth values to said image composition processing means;

causing said image composition processing means to determine degrees to which each pixel of said two-dimensional projected images is involved in the pixel value at a projection point using the two-dimensional projected images supplied and said representative display surface depth values;

determining a pixel value of said projection point by taking a total sum of said degrees of display involvement; and performing the step of determining a pixel value for each projection point and determining pixel values of the projection plane;

wherein said step of determining the single representative display surface depth value includes a step of selecting a depth value of a voxel representing a greatest degree of involvement as the single representative display surface depth value out of voxels involved in the display on said ray tracing line.

20. An image composition method according to claim 19, wherein said step of determining the degrees of display involvement includes a step of determining display involvement degrees of each pixel of said two-dimensional projected images on the basis of said parameters sequentially from an image near to the projection plane for each projection point while deciding on a front-to-back order of each pixel of the two-dimensional projected images using said representative display surface depth values.

21. An image composition method according to claim 20, wherein said step of determining the degrees of display involvement includes a step of placing a virtual light source at said projection point, assuming that a light beam is incident on said two-dimensional projected images, and executing the following computation:

Degree of display involvement=(pixel value of pixel A of nth two-dimensional projected image from projection plane)×(light quantity that has reached pixel A)× (opacity degree of nth two-dimensional projected image from projection plane)

where the nth two-dimensional projected image from the projection plane is determined for each projection point.

* * * * *